(12) United States Patent
Müller et al.

(10) Patent No.: US 7,066,187 B2
(45) Date of Patent: Jun. 27, 2006

(54) MODULAR TREATMENT PLANT HAVING HORIZONTAL DRUM MACHINES

(76) Inventors: Alois Müller, Talsperrenweg 49, Hennef-Happerschoss (DE) 53773; Martin Müller, Zum Steimelsbach 5, Hennef (DE) 53773

( * ) Notice: Subject to any disclaimer, the term of this patent is extended or adjusted under 35 U.S.C. 154(b) by 261 days.

(21) Appl. No.: 10/243,810

(22) Filed: Sep. 13, 2002

(65) Prior Publication Data

US 2003/0089386 A1    May 15, 2003

(30) Foreign Application Priority Data

| Sep. 15, 2001 | (DE) | ................................ 101 45 612 |
| Oct. 9, 2001 | (DE) | ................................ 101 49 651 |
| Dec. 24, 2001 | (DE) | ................................ 101 64 098 |

(51) Int. Cl.
*B08B 3/04* (2006.01)

(52) U.S. Cl. ............................ 134/65; 134/132; 68/58; 68/140

(58) Field of Classification Search ................ 134/132, 134/65, 79, 109, 119, 134; 68/58, 24, 140
See application file for complete search history.

(56) References Cited

U.S. PATENT DOCUMENTS

| 1,253,751 | A | * | 1/1918 | Vaughan ........................ 68/58 |
| 1,559,938 | A | * | 11/1925 | Chance .................... 209/172.5 |
| 1,647,763 | A | * | 11/1927 | Aldeen ........................ 134/65 |
| 1,831,091 | A | * | 11/1931 | Bowers ........................ 134/69 |
| 1,940,585 | A | * | 12/1933 | Fauth .......................... 422/271 |
| 2,143,497 | A | * | 1/1939 | Bostrom et al. .............. 209/21 |
| 2,229,073 | A | * | 1/1941 | Gregory ..................... 205/612 |
| 2,413,094 | A | * | 12/1946 | Yost ............................ 366/227 |
| 2,680,084 | A | * | 6/1954 | Ryan .......................... 134/35 |
| 2,795,331 | A | * | 6/1957 | Douy ....................... 209/172.5 |
| 2,857,053 | A | * | 10/1958 | Schmiedel ................... 210/211 |
| 2,909,872 | A | * | 10/1959 | Kearney et al. ............. 134/132 |
| 3,092,582 | A | * | 6/1963 | Lacker ......................... 494/36 |
| 3,911,860 | A | * | 10/1975 | Nohynek ..................... 118/695 |
| 4,073,301 | A | * | 2/1978 | Mackinnon .................. 134/65 |
| 4,173,493 | A | * | 11/1979 | Kallas .......................... 75/715 |
| 4,234,415 | A | * | 11/1980 | de Tuya Casuso ....... 209/172.5 |
| 4,244,656 | A | * | 1/1981 | Hohlbaum ............... 366/175.3 |
| 4,399,828 | A | * | 8/1983 | Kontos ........................ 134/65 |
| 4,427,518 | A | | 1/1984 | De Vries et al. |
| 4,439,320 | A | * | 3/1984 | Blok ........................... 210/394 |
| 4,453,556 | A | * | 6/1984 | Corbett ........................ 134/65 |
| 4,634,537 | A | * | 1/1987 | Schreiber ..................... 210/784 |
| 4,988,391 | A | * | 1/1991 | von Bormann ............. 134/25.5 |
| 5,020,555 | A | * | 6/1991 | Nishibayashi ................ 134/65 |
| 5,341,826 | A | * | 8/1994 | Huber et al. .................. 134/65 |

(Continued)

FOREIGN PATENT DOCUMENTS

DD    230 027 A1    11/1985

(Continued)

*Primary Examiner*—Frankie L. Stinson

(57) ABSTRACT

A machine for treating bulk material of industrial volume parts, having a treatment drum which is arranged with a horizontal axis and can be driven in both directions of rotation around the axis, the treatment drum comprises a permanently open co-axial inlet aperture and a permanently open co-axial discharge aperture, the treatment drum comprises a set of worm-like inner blades which extend at least as far as the discharge aperture and which, in the first direction of rotation of the treatment drum, reposition the bulk material in the drum and, in the second direction of rotation of the treatment drum, convey the bulk material through the discharge aperture.

5 Claims, 21 Drawing Sheets

U.S. PATENT DOCUMENTS

| | | |
|---|---|---|
| 5,460,195 A | 10/1995 | Celi |
| 5,595,349 A * | 1/1997 | Bergstrom et al. ............ 241/41 |
| 2004/0123881 A1 * | 7/2004 | Desautels ................. 134/25.1 |

FOREIGN PATENT DOCUMENTS

| | | | |
|---|---|---|---|
| DE | 21 61 446 | | 3/1973 |
| EP | 0 388 365 | | 9/1990 |
| GB | 1177815 | * | 1/1970 |
| GB | 2000526 | * | 1/1979 |
| JP | 4-157094 | * | 5/1992 |
| JP | 7-284590 | * | 10/1995 |
| JP | 8-215699 | * | 9/1996 |

* cited by examiner

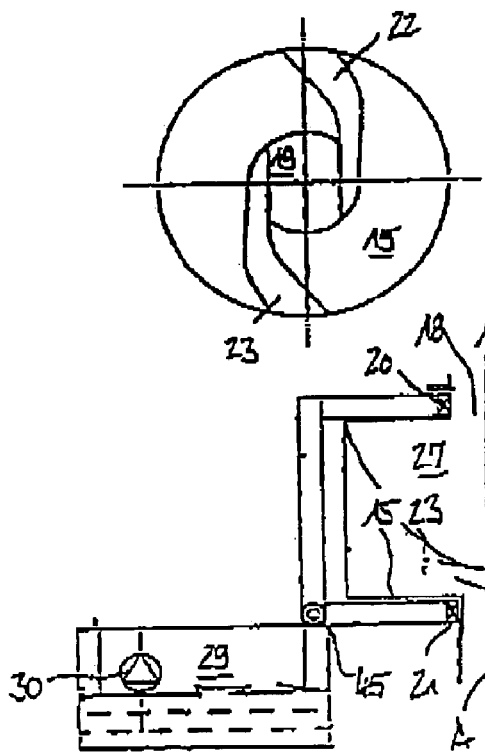
FIG. 9B
FIG. 9C
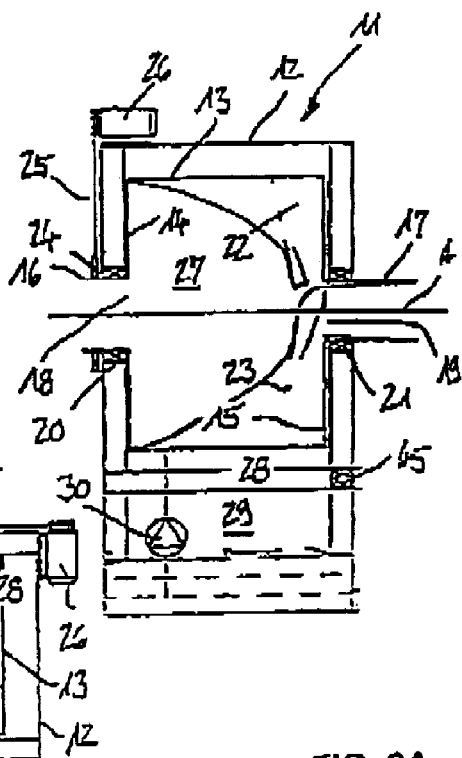
FIG. 9A

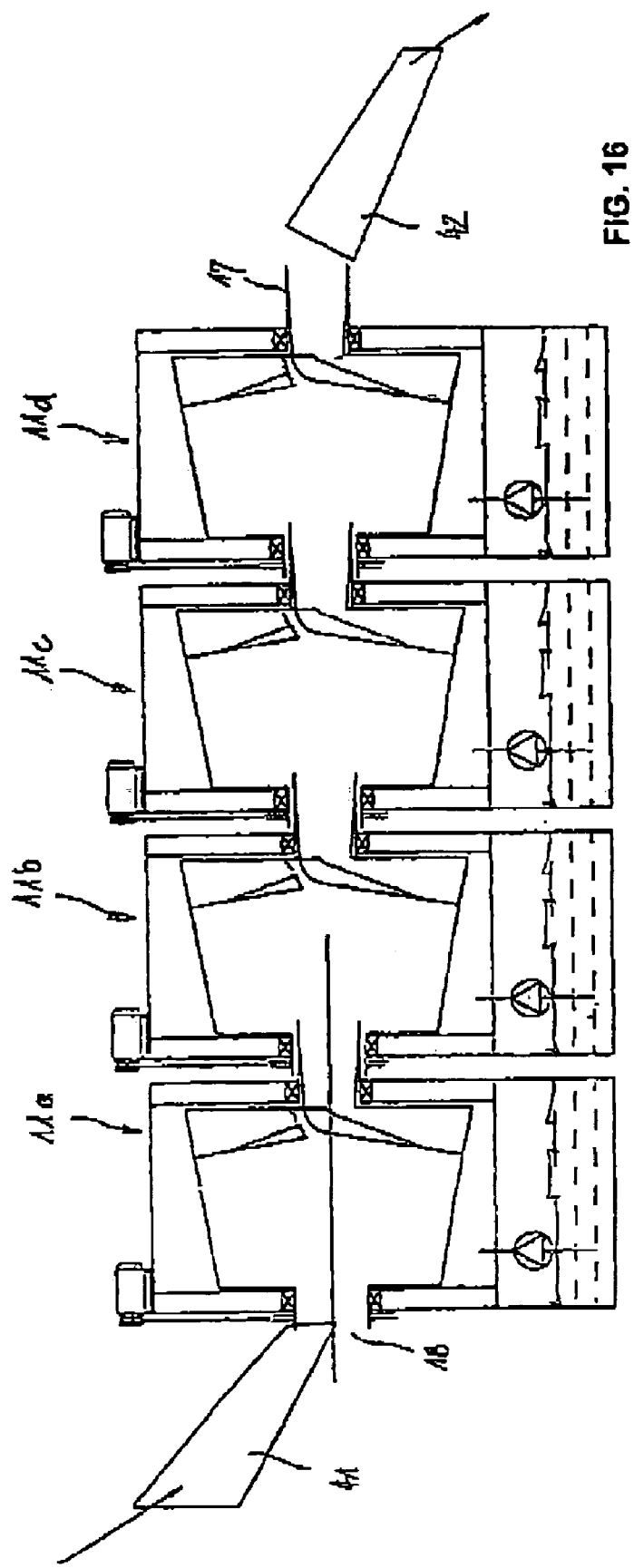

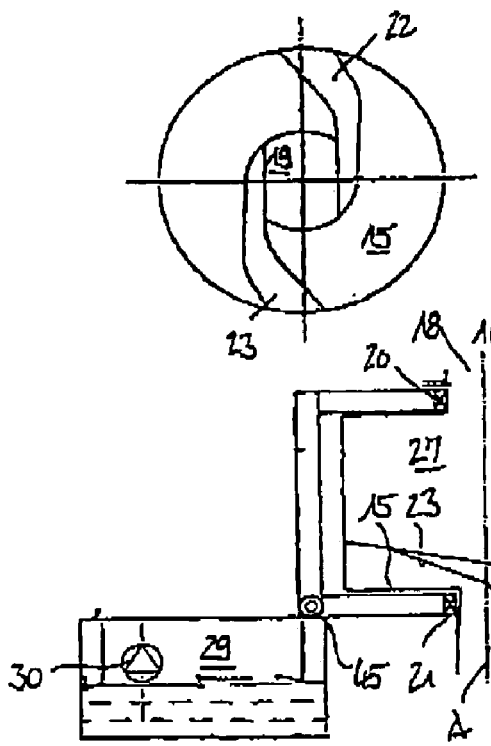
FIG. 21C
FIG. 21D
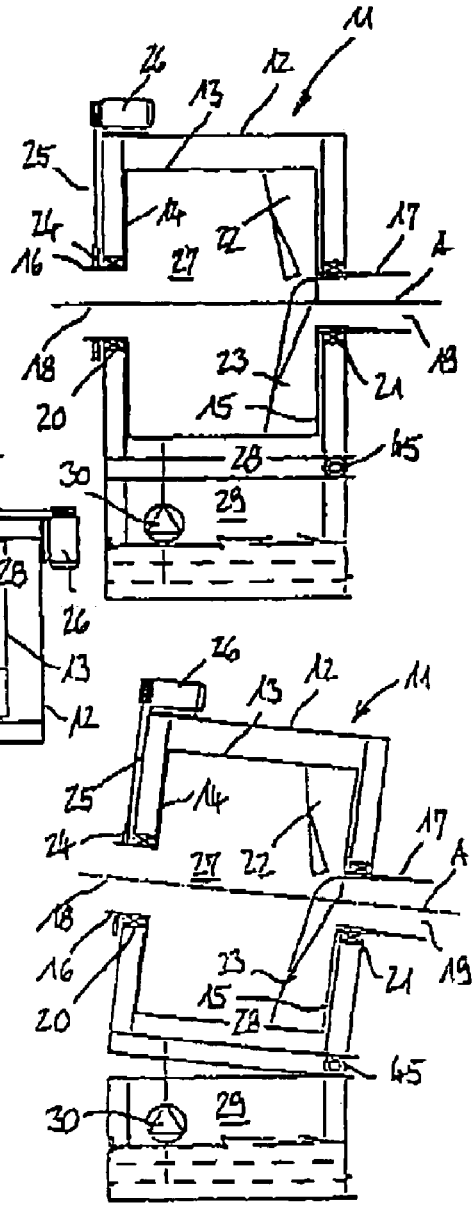
FIG. 21B
FIG. 21A

MODULAR TREATMENT PLANT HAVING HORIZONTAL DRUM MACHINES

TECHNICAL FIELD

The invention relates to a machine for treating bulk material of industrial volume parts, having a treatment drum which is arranged with a rotatable axis. Furthermore, the invention relates to a treatment plant in which at least two such machines are combined.

BACKGROUND OF THE INVENTION

The above-mentioned treatment of bulk material of industrial volume parts in liquids primarily refers to cleaning processes which follow production and machining processes in the course of which the volume parts become covered in oil or soiled in other ways. However, treatment can also refer to coating the volume parts after they have been cleaned. Finally, treatment can be of a chemical-mechanical kind for the purpose of deburring or polishing the parts.

Machines of said type with a horizontal drum axis are known in the form of worm-type washing machines wherein the volume parts pass through a tube-like drum with a worm, with the drum revolving at a slow speed in one direction. It is not possible to carry out a treatment in different washing or cleaning liquids with an increasing degree of cleanliness. Nor is it possible for the above process to be preceded by a centrifuging process for removing cutting oil or cutting emulsion or for the above process to be followed by a final drying process. So far, this has been possible only in plants for treating bulk material of industrial volume parts comprising a plurality of machines with vertical drum axes in which the volume parts are transported in inserted baskets from machine to machine. The transport means required for this purpose are sophisticated and expensive. The machines are covered with closable lids which are also relatively expensive.

SUMMARY OF THE INVENTION

The present invention provides machines of the foregoing type having a simplified design which can be filled and emptied in an advantageous way.

The present invention provides a machine having a treatment drum which is arranged with a mostly horizontal axis and which can be driven in both directions of rotation around the axis. The treatment drum comprises a permanently open co-axial inlet aperture and a permanently open co-axial discharge aperture. The treatment drum also comprises a set of worm-like inner blades which extend at least as far as the discharge aperture and which, in the first direction of rotation of the treatment drum, reposition the bulk material in the drum and, in the second direction of rotation of the treatment drum, convey the bulk material through the discharge aperture.

The worm-like or helical blades can largely be reduced to be being provided in regions near the walls and, in an axis-normal cross-section through the drum, they can be curved in themselves.

According to a first embodiment, the drum widens, in particular conically, from an inlet end and a discharge end towards an intermediate plane, and the blades start approximately in the intermediate plane. According to a second embodiment, the drum is cylindrical and the blades start approximately in the plane of the inlet aperture. The above-given configurations are advantageous for the process of emptying the drum. In order to achieve a more uniform distribution of the bulk material and more uniform flushing by the treatment liquid during the treatment phases, the axis of the drum may be in a substantially horizontal position. In order to reduce any out-of-balance in the bulk material during the centrifuging process, while the rotational speed increases, the axis of the drum can be pivoted into a vertical position.

According to another embodiment, the drum includes at least two rotation-symmetrical plate metal parts. At least one of the plate metal parts can be three-dimensionally plastically deformed. For example, it comprises a substantially dish- or bowl-shaped form. It is particularly advantageous if the drum comprises two substantially symmetrical dish-shaped parts which can be connected, such as welded or bolted, to one another by radial flanges. An annular part assisting the bearing or the rotational drive of the drum can be inserted between the flanges.

With reference to an embodiment which may be particularly suitable for small individual machines, on its greatest casing diameter, the drum comprises apertures, and the drum comprises means for supplying liquid into the drum interior. In this example, there is no need for a complete chamber which receives the drum. It is sufficient to provide splash protection means radially surrounding the drum and a collecting trough for liquid underneath the drum. In this embodiment, the bulk material is flushed by a constantly circulating liquid.

According to another embodiment which has been found to be suitable for larger machines, the drum comprises an open-worked casing and is arranged in a chamber which can be flooded with liquid.

According to another embodiment, the present invention provides a machine wherein the treatment drum comprises a permanently open co-axial inlet aperture and a permanently open co-axial discharge sleeve. The treatment drum comprises a set of worm-like inner blades which start at a distance from the inlet aperture and extend at least as far as the discharge sleeve. The lower casing line of the treatment drum descends from a filling end towards a discharge end. The treatment drum can be driven in both directions of rotation around the rotatable axis.

According to one embodiment for the foregoing machine, the drum widens conically from the inlet end to the discharge end and is arranged with a substantially horizontal axis. According to another embodiment, the drum is cylindrical and is arranged with an axis which descends from the inlet end to the discharge end. These configurations are advantageous for emptying the drum. In order to achieve, during the treatment phases, a uniform distribution of the bulk material and uniform flushing by the treatment liquid, the axis of the drum can be pivoted into a position in which the lower casing line is positioned horizontally. In order to reduce any out-of-balance in the bulk material during the centrifuging process, while the rotational speed is increasing, the axis of the drum can be pivoted into a vertical position. The changes in position may concern the drum inside a stationary chamber or the entire chamber with a firmly installed drum.

The chamber can be a collecting chamber for a liquid coolant or cutting agent, out of which chamber the liquid has to be pumped only and optionally returned to a machine tool. In general, the chamber is a treatment chamber which can be partially flooded with a treatment liquid—either a washing liquid or a coating liquid—into which chamber the liquid is introduced for treatment purposes and from which it is removed prior to the removal of the volume parts. Furthermore, the chamber can be a drying chamber which can be charged with a flow of hot air, either in combination with treatment and drying means or with drying means only.

There is thus proposed a simplified machine design which is characterised by a simple process. The volume parts can be introduced through the inlet aperture into the drum in an uncomplicated way in the form of bulk material, either directly or via a firmly installed chute. For the purpose of treating the volume parts, the drum is driven in a first driving direction of rotation in such a way that the blades displace the volume parts towards the inlet end, thus ensuring that the volume parts are continuously revolved. According to the above, an inventive machine can be used exclusively for centrifuging off cutting oil or cutting emulsion. This is particularly effective if the machine in accordance with the invention is directly associated with a machine for non-chip-forming deformation or chip-forming operations. At this stage, the cooling or cutting agent still has a high temperature and therefore comprises a particularly low viscosity, so that even a small number of revolutions are sufficient for centrifuging purposes. The expensive liquid can therefore be largely recycled.

Equally, a machine in accordance with the invention can be used exclusively for drying the volume parts by means of hot air.

The machine is largely used for treating volume parts in the chamber which is partially flooded with treatment liquid and into which the drum is introduced. After the treatment in a treatment liquid has been completed, the stationary liquid can be pumped out of/discharged from the chamber, and any treatment liquid still adhering to the volume parts can be centrifuged off at an increased rotational speed. Thereafter, the driving direction of rotation can be reversed and the worm-like curved blades leading from the drum casing to the cross-sectional plane of the discharge aperture can convey the volume parts out of the drum, preferably into an adjoining discharge sleeve from where the parts fall into an adjoining chute or a suitable transport container. The inventive machine thus does not comprise any movable means for opening, feeding, closing and locking, but can be filled and emptied in a very easy way. In this way, it becomes economically feasible to produce particularly small units which, in the form of individual machines, can be used directly in those places where the parts become polluted with oil or dirt, thus greatly simplifying the logistics of producing said parts. The term "individual machines" includes those applications where, in an in-house line of machines, non-chip-forming or chip-forming machines and inventive treatment machines alternate. An advantageous feature is the differentiation of the inlet end and the discharge end of the machine in accordance with the invention, which results in an improved material flow.

When the inventive machine is used as an individual machine, the diameter conditions of the inlet aperture and discharge aperture are of no significance. If, however, in accordance with an advantageous embodiment, the discharge aperture is followed by a discharge sleeve and the inlet aperture is greater than the outer diameter of the discharge sleeve, interlinking of a plurality of inventive machines is possible in a way which is described below in greater detail.

To facilitate the process of emptying the machine, according to a further embodiment, on its inside, the discharge sleeve widens conically towards its free end.

According to another embodiment, the chamber is connected via a pump and a return line to a liquid tank arranged in a lower position. The tank can be installed independently of the inventive machine or it can form an integral part of the machine, with the tank, in particular, being arranged underneath the chamber.

To be able to flood the chamber, it is also possible to connect the chamber, in the manner of communicating containers, to an external liquid trough which can be raised and lowered.

In another example, inside the chamber, a liquid trough is arranged which can be raised and lowered and into which the lower part of the treatment drum can be introduced as a result of the movements of the liquid trough.

The two latter embodiments are particularly suitable for processes for coating the volume parts, which includes painting, because it does not require constant circulation of the higher-viscosity liquid.

Furthermore, in accordance with a first variant, the treatment drum is supported in friction bearings or rolling-contact bearings, such as on an inlet sleeve and on the discharge sleeve. To simplify the design, it is also possible to support the treatment drum floatingly at one end, such as, only on the discharge sleeve or only on the inlet sleeve. According to a further variant, the drum is supported in a plurality of circumferentially distributed rollers which are arranged in at least two planes and which, in particular, guide the drum casing. The drum casing can be provided with circumferential tracks, so that the rollers also have an axial holding effect. The treatment drum can be driven by a chain drive which can act, for example, on a chain gear on one of the sleeves or on one of the rollers acting as a friction roller.

The present invention also provides a particularly advantageous treatment plant comprising a plurality of machines of the foregoing type which permit multi-stage treatment while simplifying the handling of the volume parts.

In a first example, a plant having at least two machines according to the present invention is provided wherein the treatment drums of the at least two machines are arranged with a largely horizontal axis and can be driven independently of one another in both directions of rotation around their respective axis. The treatment drums each comprise a permanently open co-axial inlet aperture and a permanently open co-axial discharge sleeve. The treatment drums each comprise a set of worm-like inner blades which extend at least as far as the discharge aperture and which, in the first direction of rotation of the treatment drum, reposition the bulk material in the drum and, in the second direction of rotation of the treatment drum, convey the bulk material through the discharge aperture. The machines are arranged on one level. The discharge aperture of a treatment drum of a leading machine charges the inlet aperture of the treatment drum of a subsequent machine.

The machines, in particular, are arranged with treatment drums aligned in the same sense with reference to the inlet aperture and the discharge aperture.

In a second example, a plant having at least two machines according to the present invention is provided wherein the treatment drums of the at least two machines are each arranged with a largely horizontal axis and can be driven independently of one another in both directions of rotation around their respective axis. The treatment drums each comprise a permanently open co-axial inlet aperture and a permanently open co-axial discharge aperture. The treatment drums each comprise a set of worm-like inner blades which extend at least as far as the discharge aperture and which, in the first direction of rotation of the treatment drum, reposition the bulk material in the drum and, in the second direction of rotation of the treatment drum, convey the bulk material through the discharge aperture. The machines are arranged with a subsequent one on a lower level than a leading one. A delivery pipe loaded by the discharge aperture of a treatment drum of a machine arranged on a higher level loads the inlet aperture of the treatment drum of a machine positioned on a lower level.

The machines, in particular, are arranged with treatment drums which are aligned one above the other and alternate in sense with reference to the inlet aperture and discharge sleeve.

In a third example, a plant having at least two machines according to the present invention is provided wherein the treatment drums of the at least two machines each comprise a permanently open co-axial inlet aperture and a permanently open co-axial discharge sleeve. The treatment drums each comprise a set of worm-like inner blades which begin at a distance from the inlet aperture and extend at least as far as the discharge sleeve. The lower casing line of the treatment drums descends from an inlet end to a discharge end. The machines are arranged with aligned treatment drums in the same sense with reference to the inlet aperture and the discharge sleeve. The discharge sleeve of a treatment drum of a leading machine charges the inlet aperture of the treatment drum of a subsequent machine. The treatment drums of the at least two machines can be driven independently of one another in both directions of rotation around their respective axis.

In a fourth example, a plant having at least two machines according to the present invention is provided wherein the treatment drums of the at least two machines each comprise a permanently open co-axial inlet aperture and a permanently open co-axial discharge sleeve. The treatment drums each comprise a set of worm-like inner blades which begin at a distance from the inlet aperture and extend at least as far as the discharge sleeve. The lower casing line of the treatment drums descends from an inlet end to a discharge end. The machines are arranged with treatment drums which are arranged one above the other and alternate in sense with reference to the inlet aperture and the discharge sleeve. A delivery pipe loaded by the discharge sleeve of a treatment drum of a machine positioned at a higher level charges the inlet aperture of the treatment drum of a machine arranged thereunderneath. The treatment drums of the at least two machines can be driven independently of one another in both directions of rotation around their respective axis.

These examples, and in particular, the initially mentioned diameter conditions of the inlet apertures and discharge sleeves, allow a compact combination of a plurality of individual machines wherein, without any additional transport means, it is possible to convey the volume parts in accordance with the first example directly from a machine positioned at the start of the treatment sequence into the immediately adjoining machine and to convey same in accordance with the second example via a delivery pipe from a machine positioned on a higher level in the treatment sequence into the directly adjoining machine positioned on a lower level. This requires merely a reversal of the direction of the rotation of the drum of the machine which has to be emptied. The individual machines of the plants according to the first and third examples can be inserted into longitudinal guiding means which enclose the machines in the longitudinal direction, which ensure a co-axial alignment of the machines, and permit the discharge sleeves to be easily inserted into the inlet apertures. The individual machines of the plants in accordance with the second and fourth examples can be stacked directly in a tower-like frame and connected to one another via the delivery pipes inserted into same. Sliding seals can be provided in the regions of engagement, for example, to prevent the escape of vapor, but seals can also be omitted. According to the possibilities of each of the first and second examples, the drum axes can be positioned horizontally. It is possible to provide doubly conical drum casings or cylindrical drum casings for the machines. According to the possibilities of each of the third and fourth examples, the drum axes in the case of a conical drum casing can be positioned horizontally or the drum axes in the case of a cylindrical drum casing can descend from the inlet end of the discharge end.

The operation the machines for treating bulk material of industrial volume parts is based on the above-mentioned functions as specified for the individual machines. Batches of bulk material are treated in treatment stages in a first driving direction of rotation in the individual machines and in conveying stages in a second driving direction of rotation from machine to machine. In principle, the machine drives are independent of one another, so that for example in some individual machines, the treating or centrifuging times can be longer than in others. It is also possible to pass batches through individual machines immediately in order to achieve partial treatment processes with a reduced sequence of stages. However, the conveying stages should be substantially synchronized, so that the individual batches are not mixed up.

In particular, the conveying stages can be adjusted to one another in terms of time and follow one another progressively, with slight delays only, from the last machine to the first machine. This prevents the batches from getting mixed up in that each machine into which material is conveyed was completely emptied prior to being re-filled, with the process having to start with the last machine having to be emptied first.

Whereas normally a treatment chamber is flooded from below until the open-worked drum enters the liquid, it is of course also possible to pour a gush of liquid either exclusively or additionally from above over the drum. Finally, it is also possible to arrange a rail of nozzles or nozzle apertures inside the drum itself in order to flush the parts with liquid.

A drying chamber can be provided with standard means used for drying purposes, for example nozzles for introducing a flow of hot air or electric heating coils and/or vapor extraction devices.

In a chamber used for centrifuging purposes only, it is possible to pivot the drum axis into the vertical position while increasing the driving speed and to return the drum axis into its substantially horizontal position while reducing the driving speed. In this way, the bulk material can be distributed more uniformly in the drum to avoid any out-of-balance.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings:

FIG. 9 shows the machine similar to that shown in FIG. 8 in a modified embodiment
A) in a longitudinal section
B) in a cross-section through the treatment drum
C) in a longitudinal section, with the drum axis being in the vertical position.

FIG. 16 shows a plant of machinery with four individual machines according to FIG. 13 in a longitudinal section.

FIG. 21 shows the machine according to FIG. 20 in a modified embodiment
A) in a longitudinal section in a first position
B) in a longitudinal section in a second position
C) in a cross-section through the treatment drum D) in a longitudinal section with the drum axis being in a vertical position.

DETAILED DESCRIPTION OF THE INVENTION

Figure 1A:
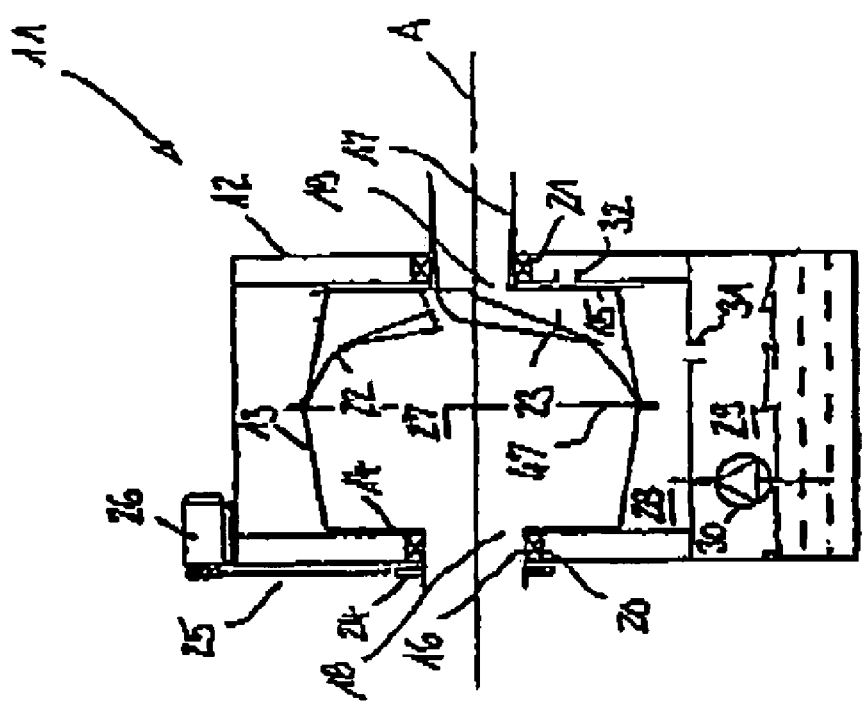
FIG. 1 shows a first embodiment of an individual machine in accordance with the invention, A) in a longitudinal section through the entire machine B) in a cross-section through the treatment drum.
Figure 1B:
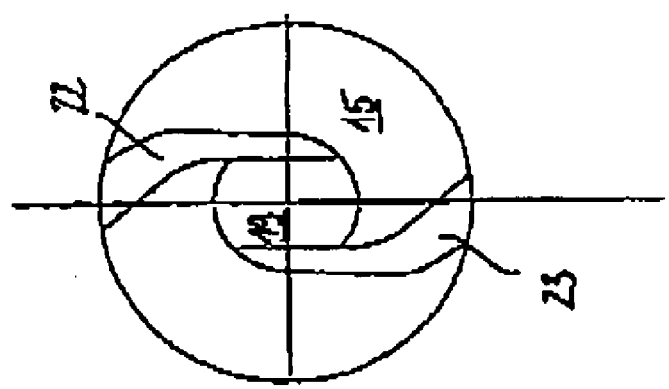

FIGS. 1A and 1B will be described jointly below. A treatment machine 11 comprises a housing 12 in which a treatment drum 27 is rotatably supported around the horizontal axis A. The treatment drum 27 comprises an open-worked and thus liquid-permeable, doubly conical drum casing 13 with two cover faces 14, 15 each adjoined by co-axial sleeves 16, 17, an inlet sleeve 16 which follows an inlet aperture 18, and a discharge sleeve 17 which follows a discharge aperture 19. The drum is supported by two bearings 20, 21 on the sleeves in the housing 12. Inside the drum, there is provided a set of worm-like blades comprising two blades 22, 23 which begin at a clear distance from the cover face 14 at the inlet end in an intermediate plane 47 of the doubly conical drum casing 13 with the largest diameter, and extend as far as the cover face 15 at the discharge end, i.e. in particular as far as the discharge aperture 19. On the inlet sleeve 16 there is positioned a chain gear 24 which, via a chain drive 25, is connected to a motor such as an electric motor 26 arranged on the housing 12. In this way, the drum 27 can be driven by the electric motor 26 in both directions of rotation. In the housing, on the bottom thereof, there is positioned a liquid tank 29 with a pump 30 through which the washing chamber positioned thereabove can be flooded. The washing chamber 28 and the tank 29 are connected to one another by a return line 31. Furthermore, there is provided an overflow 32 below the sleeve level.

The washing chamber 28 can be set, by the pump 30, to a certain filling level below the drum apertures 18, 19. It is also possible to set a dynamic balance when the pump operates continuously and when the return line 31 is permanently open. A batch of volume parts introduced through the inlet aperture 18 is treated in a treatment phase by driving the drum 27 in a first direction of rotation in the pumped-up liquid, with the blades conveying the batch against the direction of throughput, as a result of which the volume parts are circulated continuously. At the end of the treatment phase the liquid is returned via the return line 31 into the tank 29. Thereafter, with the direction of rotation remaining the same, the drum can be driven at a higher rotational speed, so that any liquid still adhering to the volume parts can be centrifuged off during a centrifuging phase. Thereafter, in a conveying phase, the drum 13 is driven by the driving motor 26 in the opposite direction, as a result of which the blades lift the volume parts from the deepest position in the intermediate plane 47 into the discharge sleeve 17 which opens conically towards the right, so that due to subsequently conveyed volume parts and the conical aperture, the parts are discharged from the discharge aperture 19. As can be seen, the inner diameter of the inlet aperture 18 is greater than the outer diameter of the sleeve 17. The two sleeves are open and need not be closed, providing the treatment machine with an extremely efficient design.

Figure 2A:
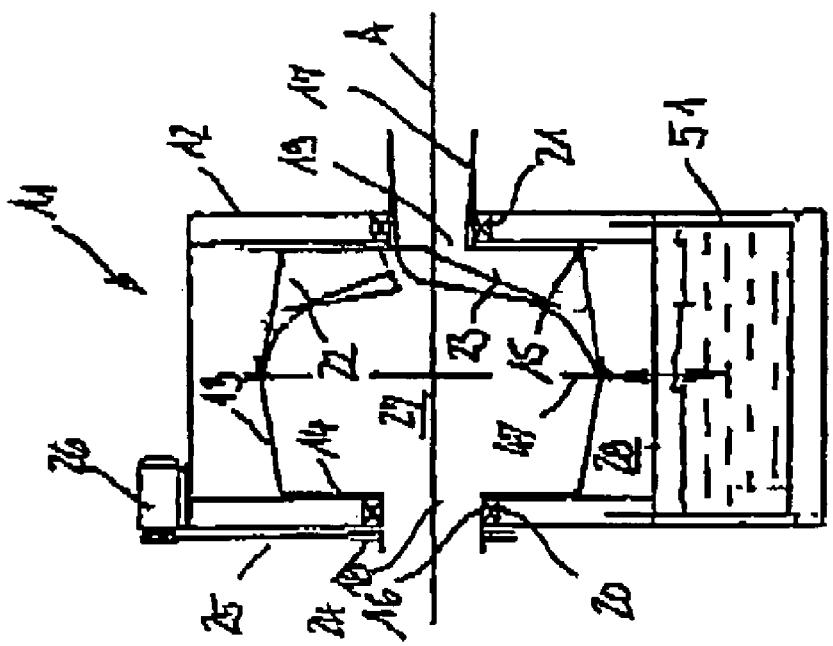
FIG. 2 shows the machine according to FIG. 1 in a first variant,
A) in a longitudinal section through the entire machine
B) in a cross-section through the treatment drum.
Figure 2B:
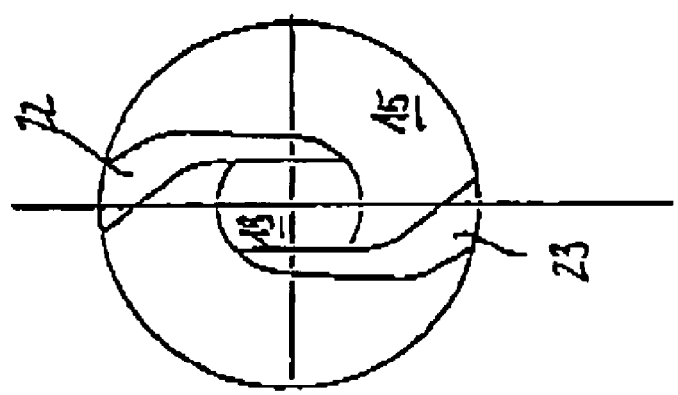

FIGS. 2A and 2B deviate from FIGS. 1A and 1B in that, instead of the pump 30, return line 31 and overflow 32, which have been eliminated, there is provided a height-adjustable liquid trough 51 inside the treatment chamber 28, which contains the treatment liquid and which, depending on the amount of liquid consumed, can be refilled. By lifting the liquid trough 51, the treatment drum 27 enters the filled trough. By lowering the liquid trough 51, the treatment drum re-emerges from the latter and is subsequently emptied as a result of the direction of rotation being reversed. Otherwise, the operation of the machine is the same and thus reference is made to the description of FIGS. 1A and 1B.

Figure 3A:
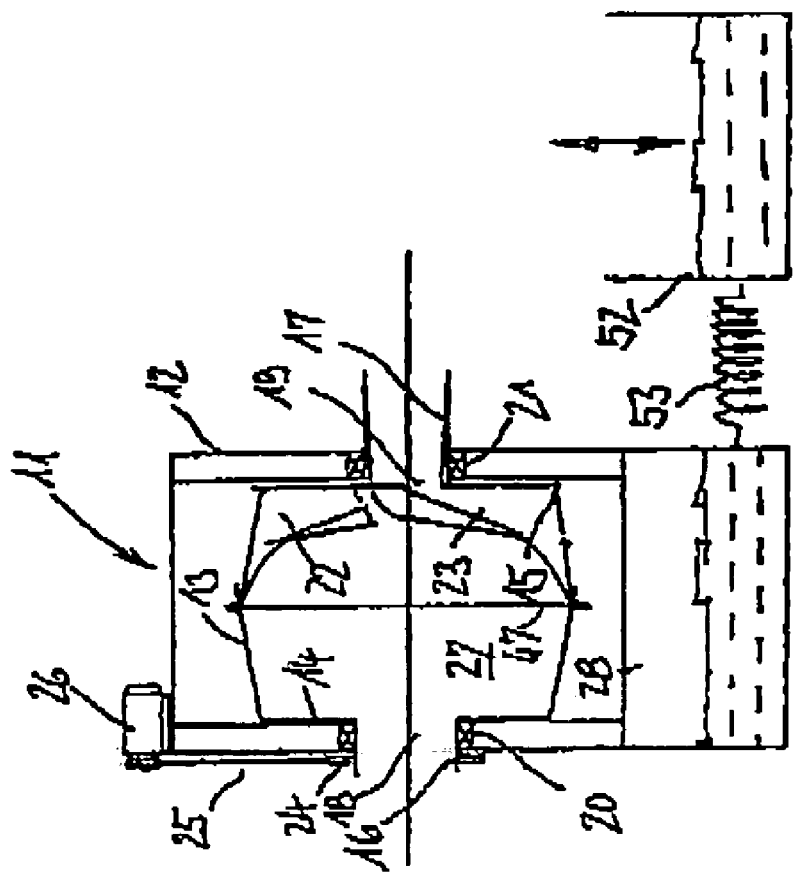
FIG. 3 shows the machine according to FIG. 1 in a second variant
A) in a longitudinal section through the entire machine
B) in a cross-section through the treatment drum.
Figure 3B:
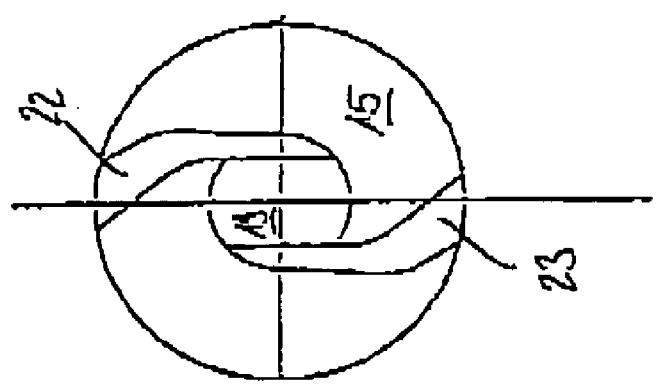

FIGS. 3A and 3B deviate from FIGS. 1A and 1B in that, instead of the pump 30, return line 31 and overflow 32, which have been eliminated, there is provided a height-adjustable liquid trough 52 outside the treatment chamber 28 which is connected to the latter via a flexible line 53 so as to be always open. The liquid trough 52 and the treatment chamber 28 contain treatment liquid which, depending on the amount of liquid consumed, can be re-supplied. If the liquid trough 52 is lifted, the liquid level in the treatment chamber rises and the treatment drum 27 is partially immersed. By lowering the liquid trough 52, the liquid level drops and the treatment drum re-emerges and is subsequently emptied as a result of the direction of rotation being reversed. Otherwise, the operation of the machine is the same and thus reference is made to the description of FIGS. 1A and 1B.

Figure 4:
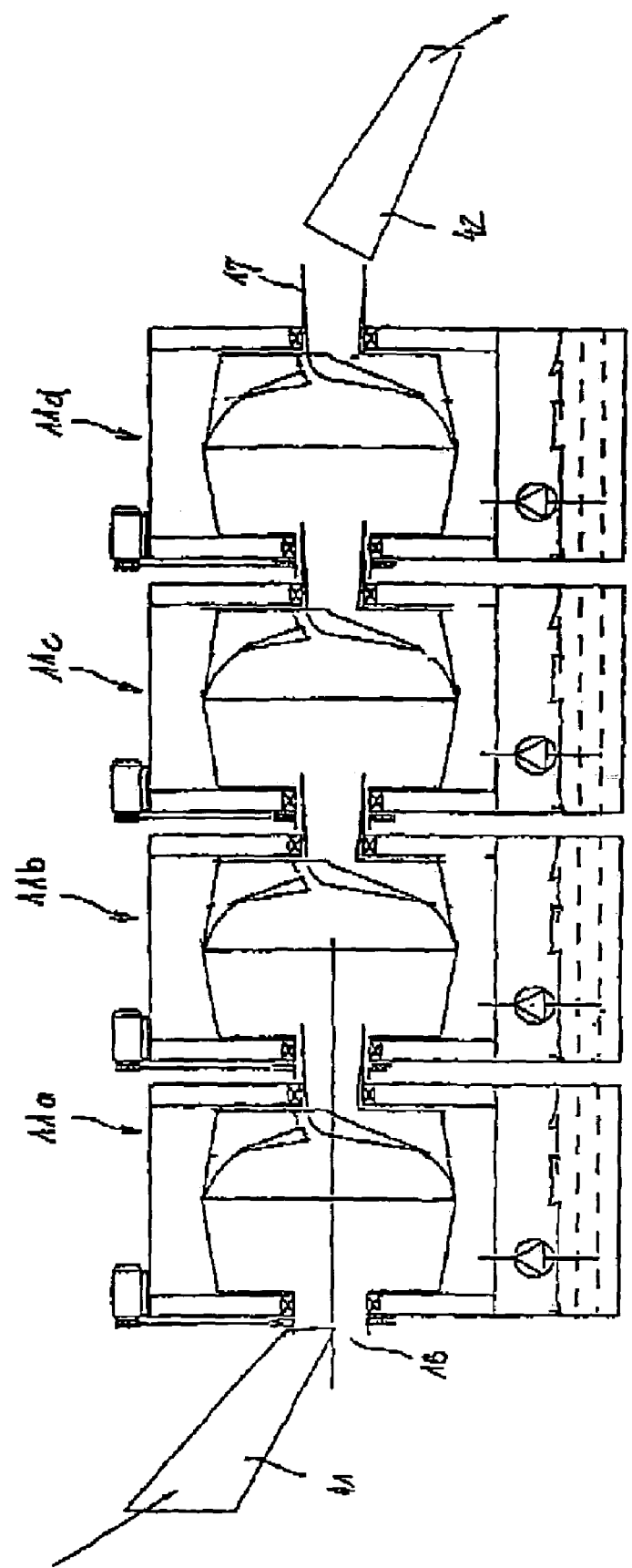
FIG. 4 shows a plant of machinery with four individual machines according to FIG. 1 in a longitudinal section.

In FIG. 4, four individual machines according to FIGS. 1A and 1B are combined to form a modular plant of machinery which, in addition, comprises an inlet chute 41 and a discharge chute 42. The inlet chute 41 extends into the inlet aperture 18 of the first individual machine 11a shown in the conveying direction on the left-hand side. Into the discharge chute 42 there extends the discharge sleeve 17 of the last individual machine 11d shown on the right-hand side in the conveying direction. Further details are not given and reference is made to the description of FIGS. 1A and 1B. The individual machines can be operated with different treatment liquids. Of course, fewer or more than four machines can be arranged depending upon the particular parts operation under consideration. In one embodiment, they are placed into common longitudinal guiding means which permit the illustrated type of assembly wherein an inlet sleeve 16 of a further machine can be slid over the discharge sleeve 17 of a machine provided in the conveying direction.

Figure 5A:
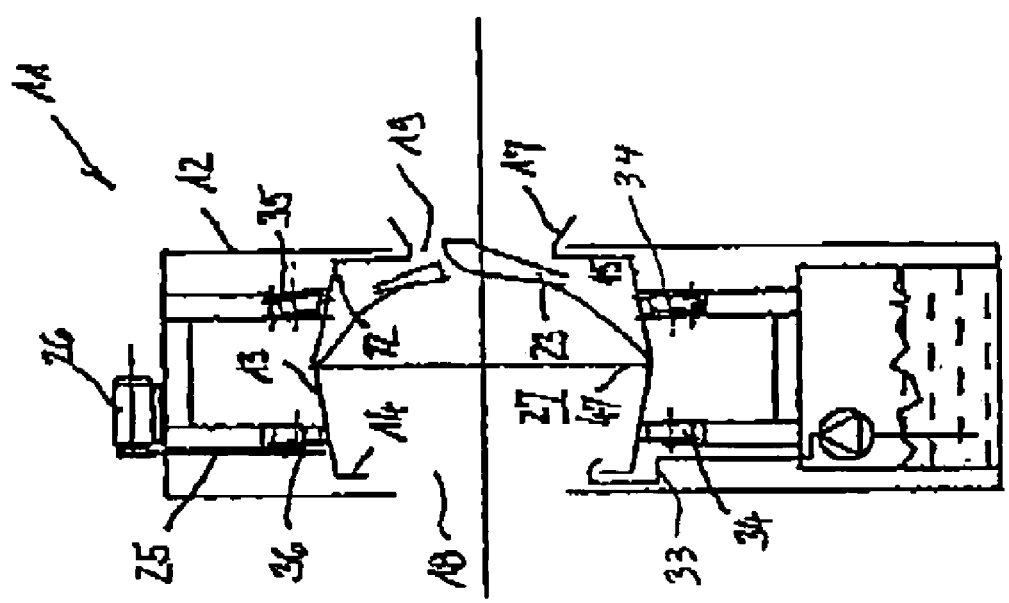
FIG. 5 shows an individual machine according to the present invention in a second embodiment
A) in a longitudinal section through the entire machine
B) in a cross-section through the treatment drum.
Figure 5B:
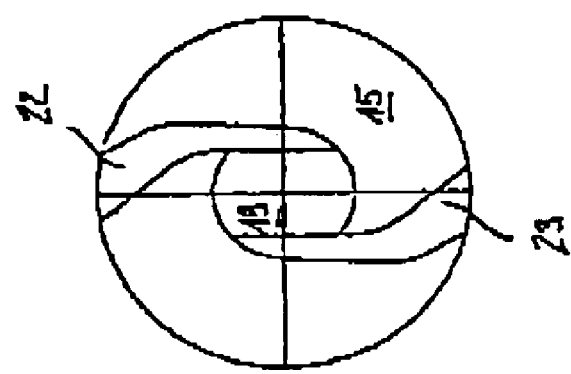

FIG. 5 shows an individual machine in a modified embodiment. Any details which are identical to those of the machine according to FIGS. 1A and 1B have been given the same reference numbers and to that extent reference is made to the description of FIGS. 1A and 1B. Only the deviating elements will be referred to below. In this example, an inlet sleeve has not been provided, which allows the possibility of a simplified design. A line 33 which directly extends to the drum 27 is connected to the pump 30. As a result, the drum 27 does not necessarily require a complete open-worked casing 13. A ring with apertures in the intermediate plane 47 of the doubly conical drum 27 with the greatest diameter can be sufficient for discharging and centrifuging off the liquid. The drum 27 is supported in rollers 34, 35 on its casing 13, and the casing can be provided with suitable circumferential tracks for axially guiding the drum. Via a chain drive 25, the motor 26 drives a friction roller 36 which effects the drum drive. In this case, too, the drum 27 can be driven in both directions of rotation.

Figure 6:
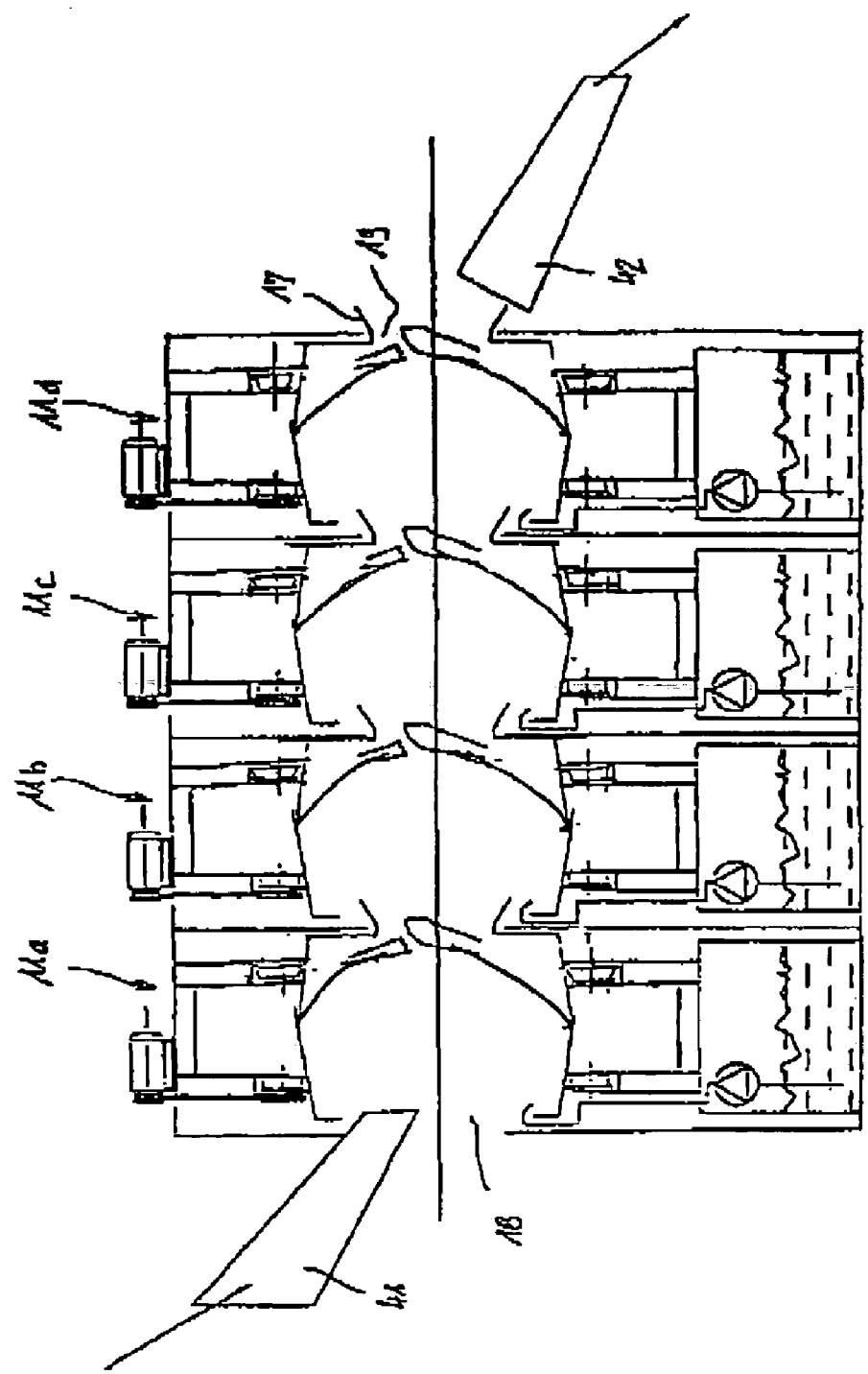
FIG. 6 shows a plant of machinery with four individual machines according to FIG. 5 in a longitudinal section.

In FIG. 6, four individual machines according to FIG. 5 have been combined to form a modular plant of machinery which, again, comprises an inlet chute 41 and a discharge chute 42. The discharge sleeves of the preceding machines extend directly through the inlet aperture 18 into the drum of the subsequent machine. As far as functioning is concerned, reference is made to the description of FIG. 4. The same process can be applied here and, as well, the number of machines can vary as desired for the particular parts operation.

Figure 7:
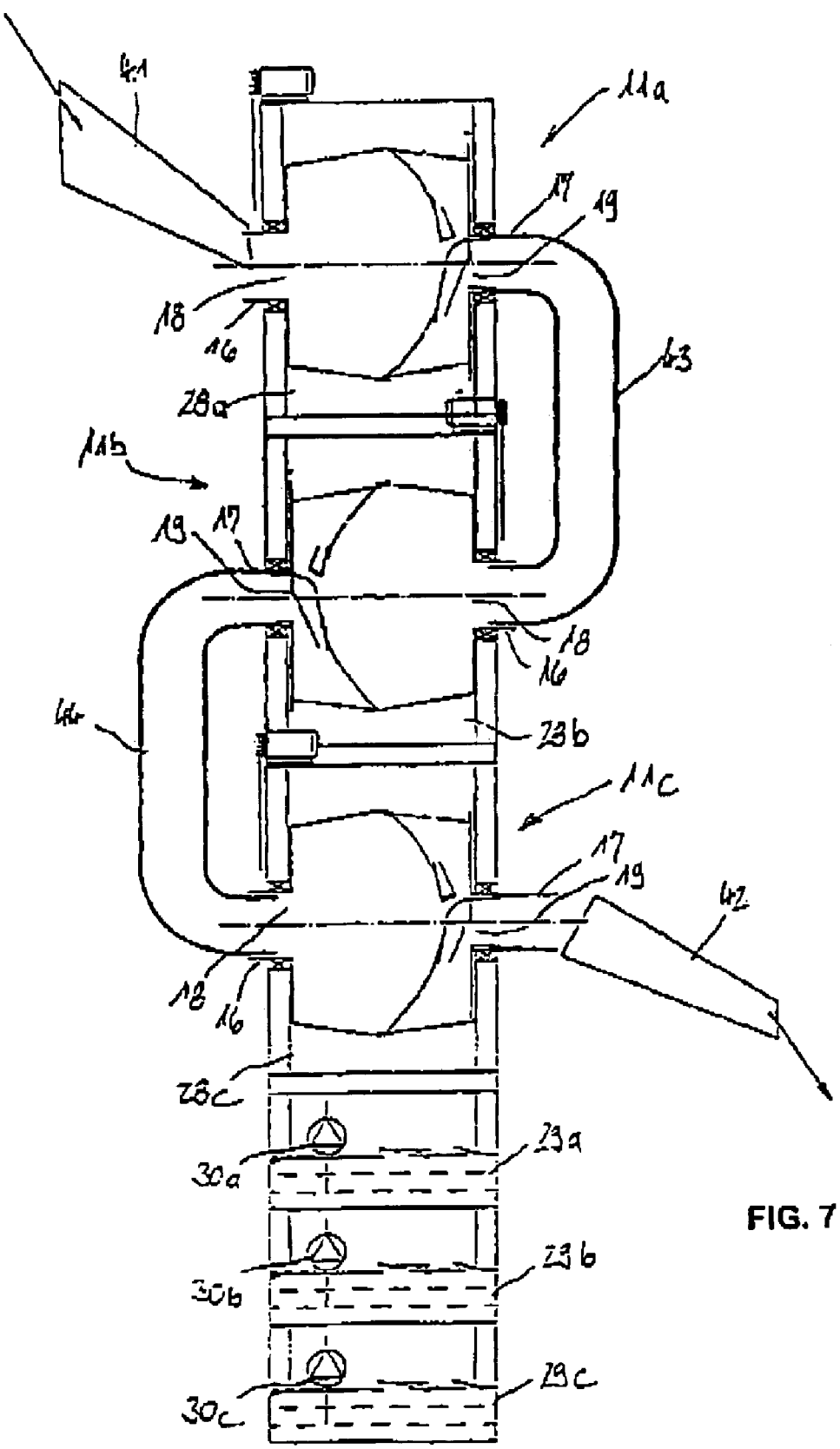
FIG. 7 shows a plant of machinery with three individual machines similar to FIG. 1 in a longitudinal section.

In FIG. 7, three individual machines according to FIG. 1 have been combined to form a modular plant of machinery which, in addition, comprises an inlet chute 41 and a discharge chute 42. The inlet chute 41 extends into the inlet aperture 18 of the first upper individual machine 11a arranged in the conveying direction. The discharge sleeve 17 of the lower individual machine 11c arranged in the conveying direction extends into the discharge chute 42. Between the two machines, there is provided the individual machine 11b which is the second machine in the conveying direction and whose direction of throughput, contrary to that of the previously mentioned machine, extends from right to left, with a first delivery pipe 43 connecting the discharge aperture 19 of the first machine 11a to the inlet aperture 18 of the second machine 11b and with a second delivery pipe 44 connecting the discharge aperture 19 of the second machine 11b to the inlet aperture 18 of the lower machine 11b. The present example deviates from the embodiment of the individual machines according to FIG. 1 in that the liquid tanks 29a,29b and 29c are arranged one above the other underneath the three machines whose washing chambers 28a,28b and 28c are stacked directly one above the other. The chamber 28 and the liquid tanks 29 can be stacked one above the other in an upright rack. The individual liquid tanks 29 and thus the individual chambers can be operated with different treatment liquids. The conveying lines from the pumps 30a,30b,30c to the chambers and the return lines from the chambers to the tanks are not shown for purposes of simplifying the drawing. The delivery pipes 43, 44 can be firmly arranged in the upright frame after the individual machines have been stacked.

The two illustrations of FIG. 8 will be described jointly below. A treatment machine 11 comprises a housing 12 in which a treatment drum 27 is rotatably supported around an axis A. The treatment drum comprises an open-worked and thus liquid-permeable cylindrical drum casing 13 with two cover faces 14, 15 which are each followed by co-axial sleeves 16, 17, an inlet sleeve 16 which adjoins an inlet aperture 18 and a discharge sleeve 17 which follows a discharge aperture 19. The drum is supported by two bearings 20, 21 on its sleeves in the housing 12. Inside the drum, there is provided a set of worm-like blades consisting of two blades 22, 23 which begin at the cover face 14 at the inlet end and extend as far as the cover face 15 at the discharge end, i.e. at the discharge aperture 19. On the inlet sleeve 16 there is positioned a chain gear 24 which, via a chain drive 25, is connected to a motor such as an electric motor 26 arranged on the housing 12. In this way, the drum 27 can be driven by the electric motor 26 in both direction of rotation. Underneath the housing 12, there is provided a firmly installed liquid tank 29 with a pump 30 by means of which the washing chamber 28 formed by the housing can be flooded. The washing chamber 28 and the tank 29 are connected to one another by a pump 30 and by a return line 31, with the line connections being flexible.

The illustrations of FIG. 9 will be described jointly below. A treatment machine substantially has the same characteristics as the machine according to FIG. 8. Identical details have been given the same reference numbers. To that extent, reference is made to the description of FIG. 8. The housing 12, in its entirety, together with the drum 13, can be pivoted around a pivot axis 45 extending perpendicularly relative to the drawing plane. The mechanisms effecting the pivot action is not illustrated but all such mechanisms are contemplated by the present invention.

The treatment position, with a horizontal drum axis A and thus with a horizontal lower casing line of the drum 27, as shown in illustration 9A, in the direction of rotation of the drum, is such that, during the treatment phase, the blades convey the bulk material towards the inlet end. In the process, the bulk material is uniformly distributed across the drum portion not comprising any blades. During the subsequent emptying phase, the direction of rotation of the drum is such that the blades convey the bulk material from the drum casing 13 into the discharge sleeve 17. The bulk material in the drum casing is supplied by the blades which extend as far as the inlet end.

In illustration 9C, the treatment drum 27 is temporarily pivoted into a centrifuging position with a vertical drum axis A. It is possible, with the direction of rotation being in accordance with the treatment phase, to increase the rotational speed slowly and, simultaneously, to pivot the drum axis A into the vertical position, after the treatment liquid had previously been pumped out. This is an advantageous way of carrying out the centrifuging process while avoiding any out-of-balance symptoms in the bulk material. At the end of the centrifuging process, the drum—with the rotational speed still being slightly increased—is returned into the position as shown in illustration 9A. Thereafter, the direction of rotation of the drum can be reversed into the direction of rotation required for emptying purposes.

Figure 8B:
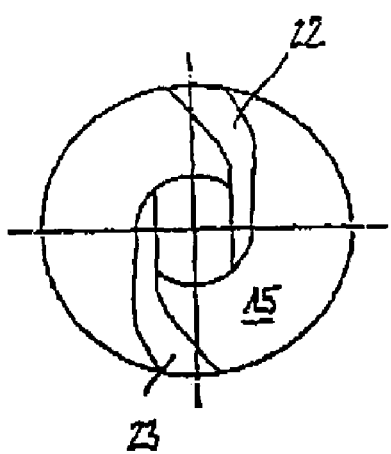
FIG. 8 shows an individual machine according to the present invention in a third embodiment
A) in a longitudinal section
B) in a cross-section through the treatment drum.
Figure 8A:
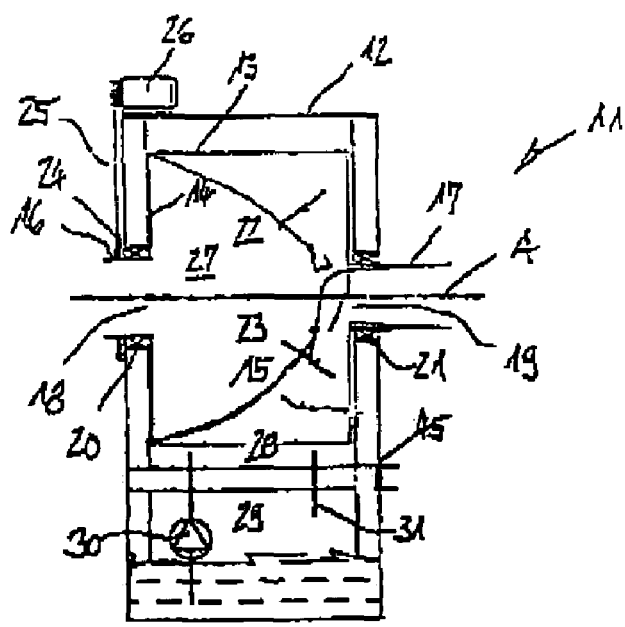
Figure 10:
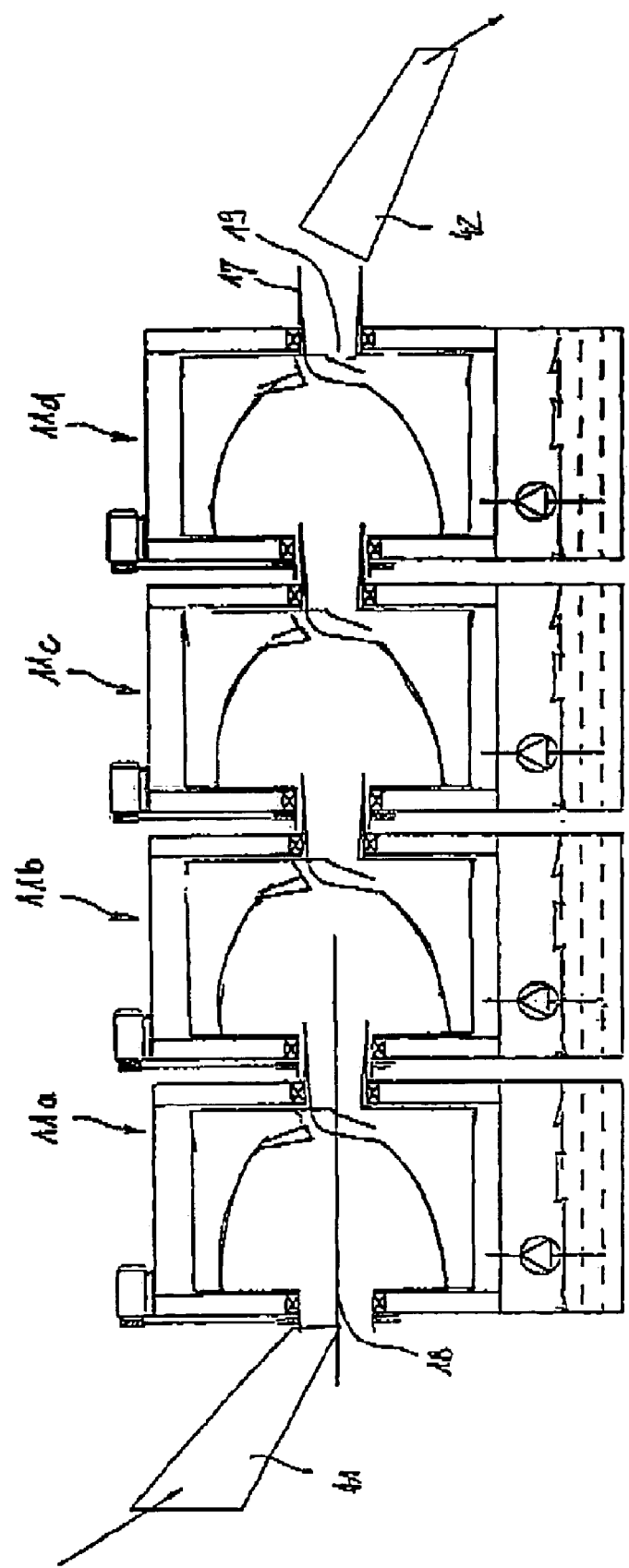
FIG. 10 shows a plant of machinery with four individual machines similar to FIG. 8 in a longitudinal section.

In FIG. 10, four individual machines similar to FIG. 8 are combined to form a modular plant of machinery, which, in addition, comprises an inlet chute 41 and a discharge chute 42. The individual machines 11a,11b,11c,11d are arranged with horizontally positioned axes. An inlet sleeve 16 of a further machine is slid over the discharge sleeve 17 of a machine preceding in the conveying direction. Otherwise, the operation of the plant is the same and thus, reference is made to the description of FIG. 8.

Figure 11:
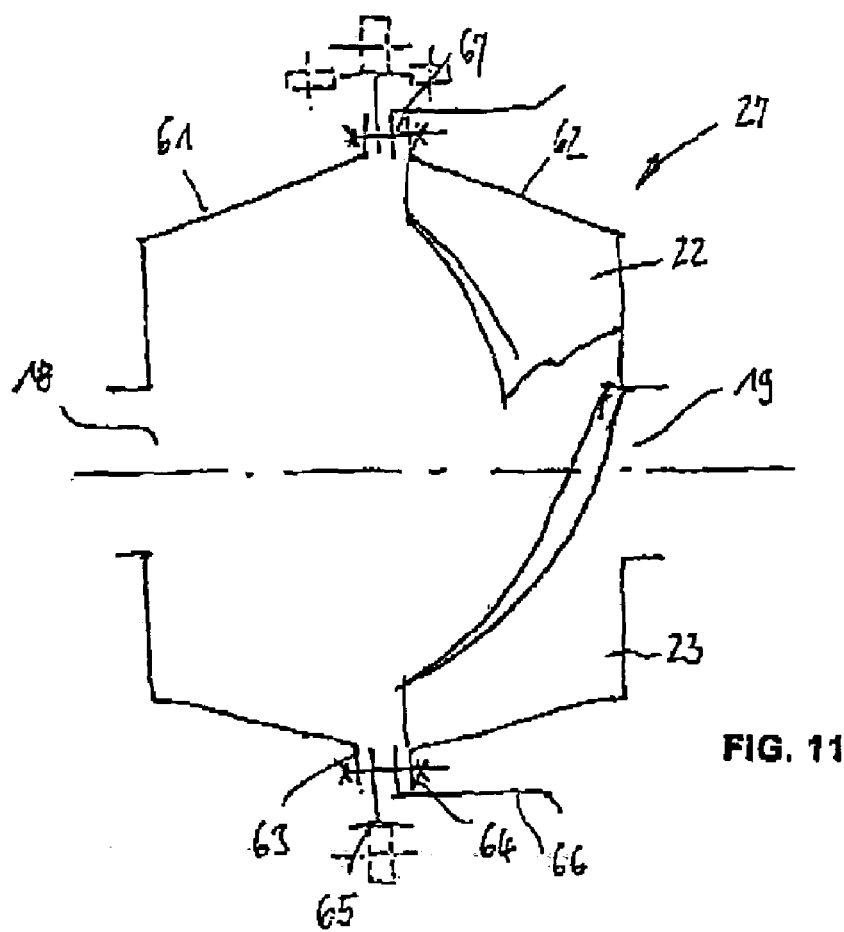
FIG. 11 shows a drum in the form of a detail in a first embodiment in a longitudinal section.

FIG. 11 shows a drum 27 which comprising two deep-drawn dishes 61, 62. The dishes form the inlet aperture 18 and the discharge aperture 19, respectively. The second dish 62 contains the inner set of blades comprising the two blades 22, 23. The two dishes 61, 62 widen anti-conically to form an intermediate plane. Towards the intermediate plane, the dishes comprise flanges 63, 64 into which there is inserted an annular web 65 with a T-shaped cross-section and an annular web 66 with an L-shaped cross-section. A friction roller with a driving function can roll on the ring 65. Furthermore, circumferentially distributed rollers with bearing functions can roll on the cylindrical part of the ring 65. The ring 66 serves for laterally draining off liquid emerging from the open-worked casting in order to protect the bearings or driving members. The flanges 63, 64 and the rings 65, 66 are tensioned relative to one another by threaded connections 67.

Figure 12:
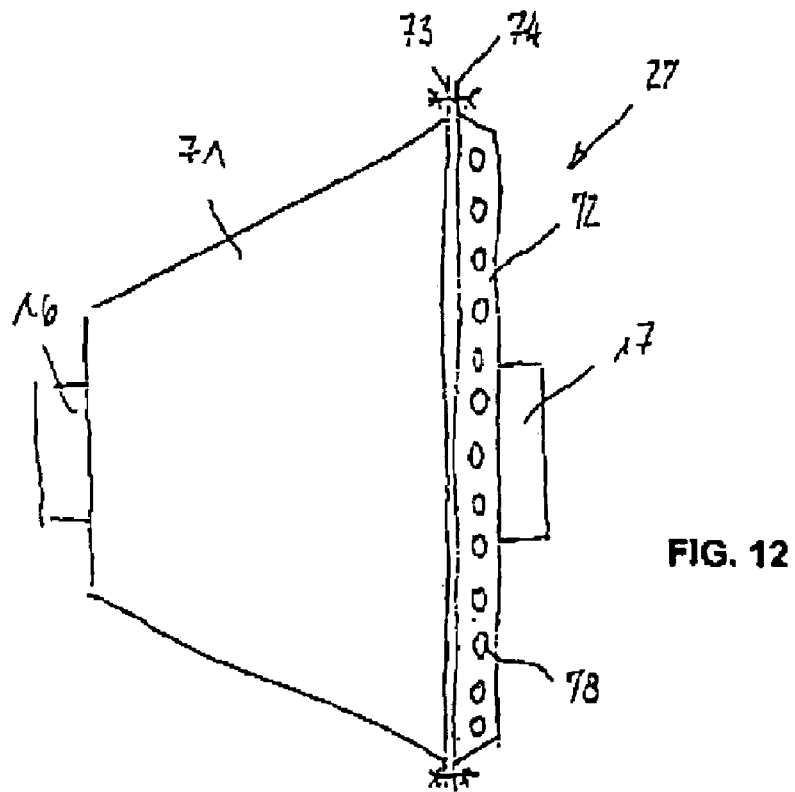
FIG. 12 shows an assembled drum in a second embodiment in the form of a detail in a plan view.

FIG. 12 shows a drum 27 in the form of a detail. It comprises two different deep-drawn dishes 71, 72, with an inlet sleeve 16 and a discharge sleeve 17 being formed on to said dishes. The two dishes are bolted to one another via flanges 73, 74. In the relatively flat conical dish member 72, there is provided a row of apertures 78 which serve to drain off and centrifuge off liquid. In this embodiment, the supply of liquid is preferably effected through one of the sleeves 16, 17 into the drum interior. The row of apertures 78 can be encased by simple annular injection-molded protective means.

The two illustrations of FIG. 13 will be described jointly below. A treatment machine 11 comprises a housing 12 in which a treatment drum 27 is rotatably supported around the horizontal axis A. The treatment drum comprises an open-worked and thus liquid-permeable conical drum casing 13 with two cover faces 14, 15 which are each followed by co-axial sleeves 16, 17, an inlet sleeve 16 which forms an inlet aperture 18 and a discharge sleeve 17 which forms a discharge aperture 19. The drum is supported by two bearings 20, 21 on the sleeves in the housing. Inside the drum, there is provided a set of worm-like blades comprising two blades 22, 23 which begin at a clear distance from the cover face 14 at the inlet end and extend as far as the cover face 15 at the discharge end, i.e. in particular, as far as the discharge sleeve 17. On the inlet sleeve 16 there is positioned a chain gear 24 which, via a chain drive 25, is connected to an electric motor 26 arranged on the housing 12. In this way, the drum 27 can be driven by the electric motor 26 in both direction of rotation. In the housing, at the bottom end thereof, there is provided a liquid tank 29 with a drum 30 by means of which the washing chamber 28 thereabove is flooded. The washing chamber 28 and the tank 29 are connected to one another via a return line 31. Furthermore, there is provided an overflow 32 below the sleeve level.

The washing chamber 28 can be set, by the pump 30, to a certain filling level below the sleeve apertures 18, 19. It is also possible to set a dynamic balance when the pump operates continuously and when the return line 31 is permanently open. A batch of volume parts introduced through the inlet aperture 18 is treated in a treatment phase by driving the drum 27 in a first direction of rotation in the pumped-up liquid, with the blades conveying the batch against the direction of the conical aperture, as a result of which the volume parts are circulated continuously. At the end of a treatment phase the liquid is returned via the return line 31 into the tank 29. Thereafter, with the direction of rotation remaining the same, the drum can be driven at a higher rotational speed, so that any liquid still adhering to the volume parts can be centrifuged off during a centrifuging phase. Thereafter, in a conveying phase, the drum 13 is driven by the driving motor 26 in the opposite direction, as a result of which the blades 22, 23 lift the volume parts into the discharge sleeve 17 which opens conically towards the right, so that due to subsequently conveyed volume part and the conical aperture, the parts are discharged from the discharge aperture 19. As can be seen, the inner diameter of the sleeve 16 and thus of the inlet aperture 18 is greater than the outer diameter of the sleeve 17 at the discharge aperture 19. The two sleeves are permanently open and cannot be closed, so that the treatment machine is characterised by a simplified design.

Figure 13A:
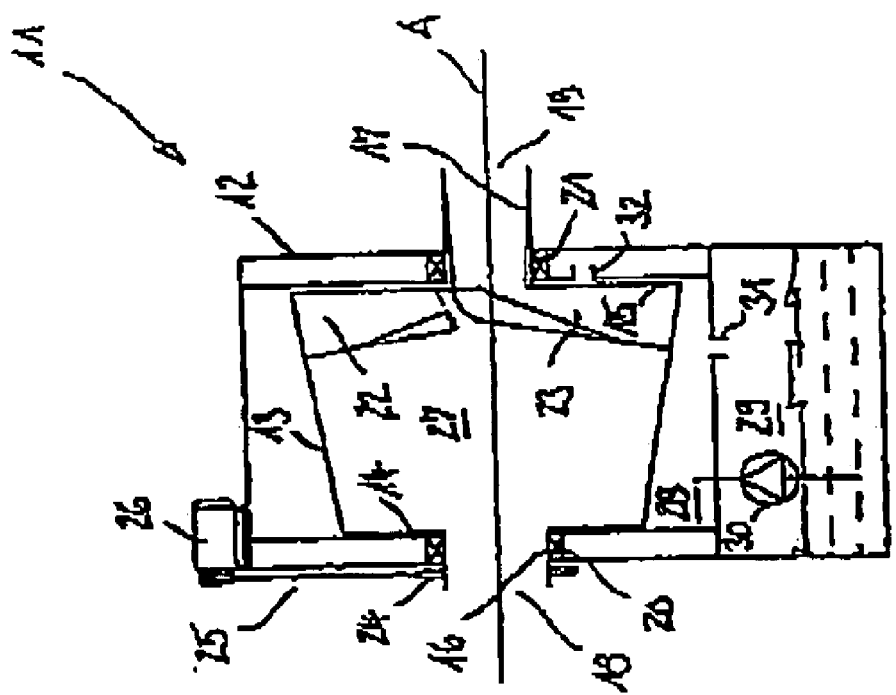
FIG. 13 shows an individual machine according to the present invention in another embodiment
A) in a longitudinal section through the entire machine
B) in a cross-section through the treatment drum.
Figure 13B:
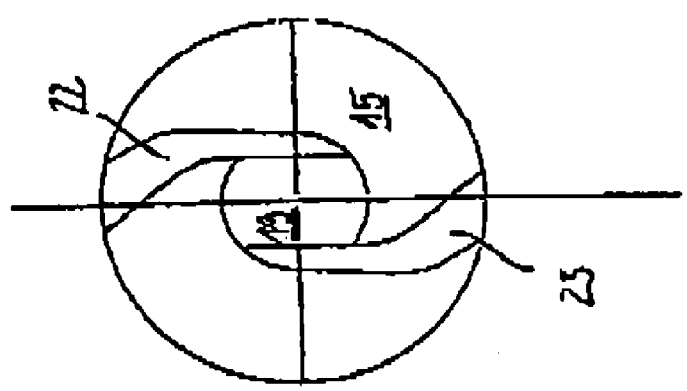
Figure 14A:
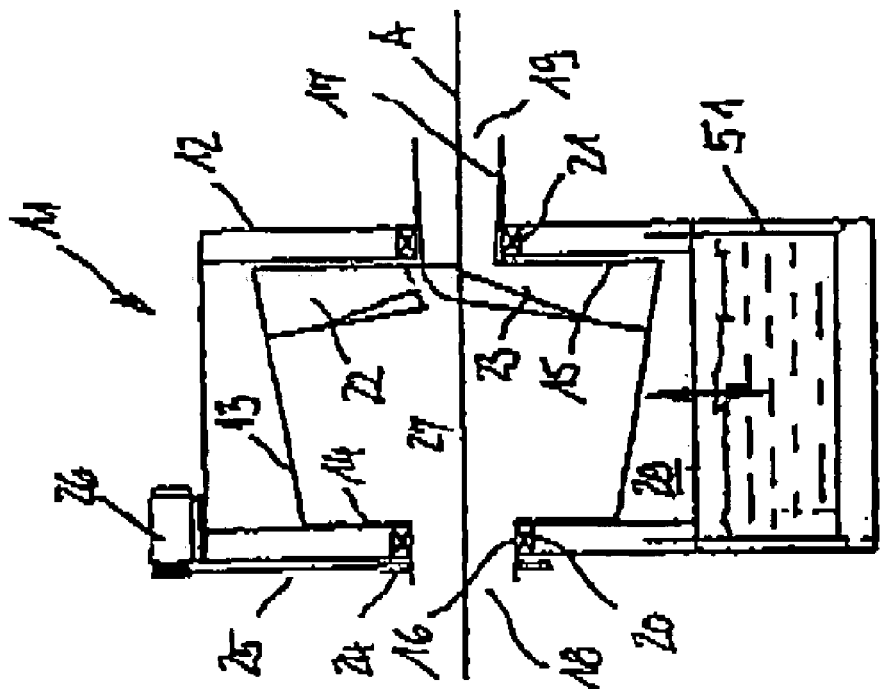
FIG. 14 shows the machine according to FIG. 13 in a first variant
A) in a longitudinal section through the entire machine
B) in a cross-section through the treatment drum
Figure 14B:
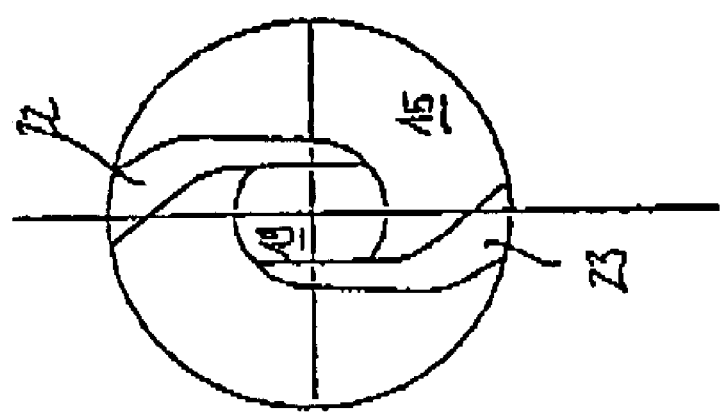

FIG. 14 deviates from FIG. 13 in that, instead of the pump 30, return line 31 and overflow 32, which have been eliminated, there is provided a height-adjustable liquid trough 51 inside the treatment chamber 28, which contains the treatment liquid and which, depending on the amount of liquid consumed, can be refilled. By lifting the liquid trough 51, the treatment drum 27 enters the filled trough. By lowering the liquid trough 51, the treatment drum re-emerges from the latter and is subsequently emptied as a result of the direction of rotation being reversed. Otherwise, with regard to the operation of the machine, reference is made to the description of FIG. 13.

Figure 15A:
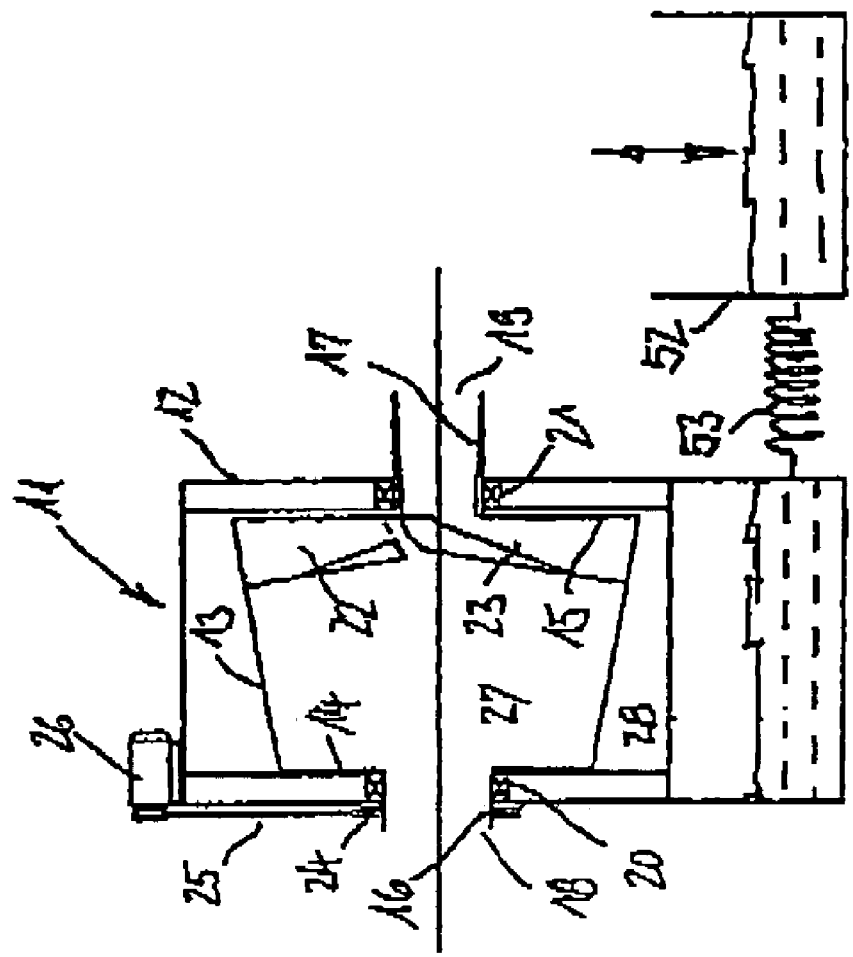
FIG. 15 shows the machine according to FIG. 13 in a second variant
A) in a longitudinal section through the entire machine
B) in a cross-section through the treatment drum.
Figure 15B:
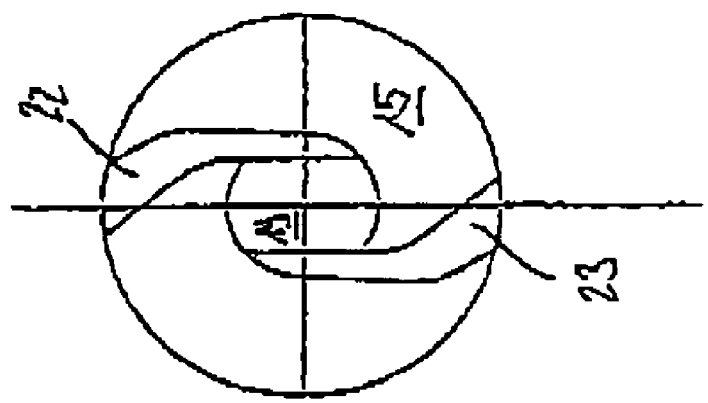

FIG. 15 deviates from FIG. 13 in that, instead of the pump 30, return line 31 and overflow 32, which have been eliminated, there is provided a height-adjustable liquid trough 52 outside the treatment chamber 28 which liquid trough 52 is connected to the treatment chamber 28 via a flexible line 53 so as to be permanently open. The liquid trough 52 and the treatment chamber 28 contain treatment liquid which, depending on the amount of liquid consumed, can be re-supplied. If the liquid trough 52 is lifted, the liquid level in the treatment chamber rises and the treatment chamber 27 is partially immersed. By lowering the liquid trough 52, the liquid level drops and the treatment drum re-emerges and is subsequently emptied as a result of the direction of rotation being reversed. Otherwise, with regard to the operation of the machine, reference is made to the description of FIG. 13.

In FIG. 16, four individual machines according to FIG. 13 are combined to form a modular plant of machinery which, in addition, comprises an inlet chute 41 and a discharge chute 42. The inlet chute 41 extends into the inlet aperture 18 of the first individual machine 11a shown in the conveying direction on the left-hand side. Into the discharge chute 42 there extends the discharge sleeve 17 of the last individual machine 11d shown on the right-hand side in the conveying direction. Further details are not given and reference is made to the description of FIG. 13. The individual machines can be operated with different treatment liquids. Of course, the number of machines can also vary. In one embodiment, they are placed into common longitudinal guiding means which permit the illustrated type of assembly wherein an inlet sleeve 16 of a further machine can be slid over the discharge sleeve 17 of a machine preceding in the conveying direction.

Figure 17A:
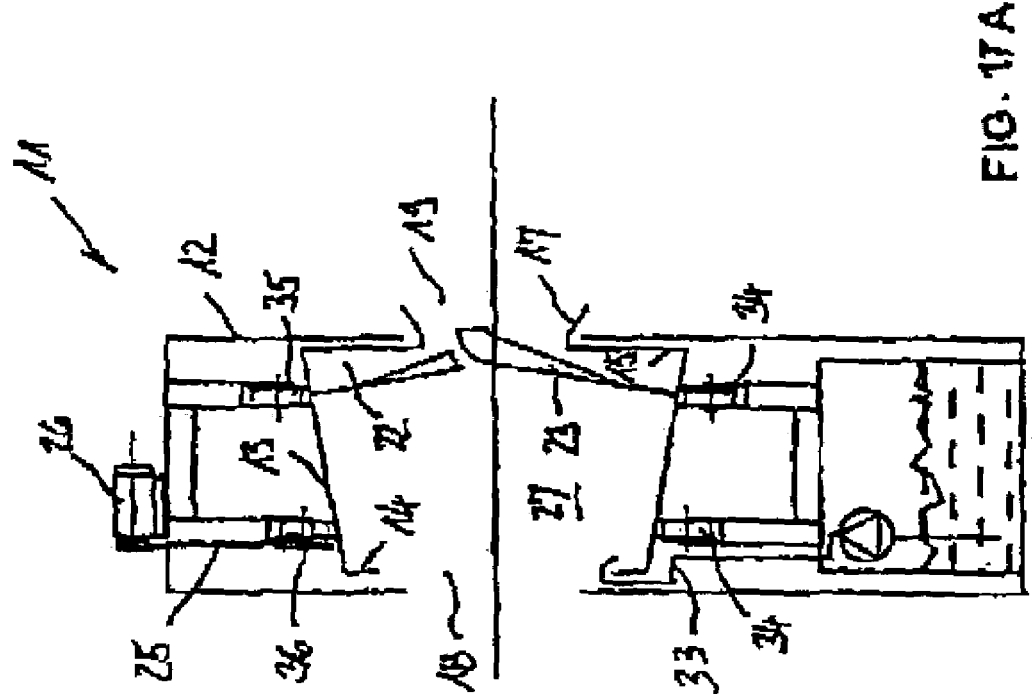
FIG. 17 shows an individual machine according to the present invention in a further embodiment
A) in a longitudinal section through the entire machine
B) in a cross-section through the treatment drum.
Figure 17B:
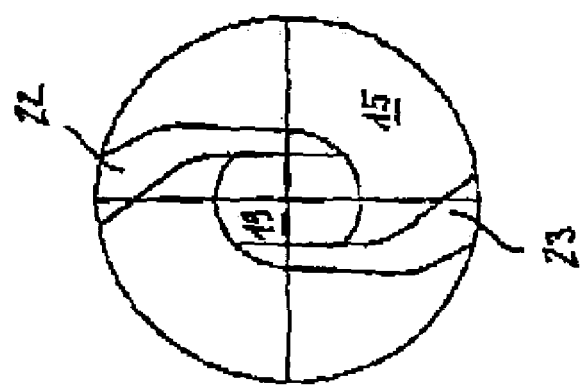

FIG. 17 shows an individual machine in a modified embodiment. Any details which are identical to those of the machine according to FIG. 13 have been given the same reference numbers and to that extent reference is made to the description of FIG. 13. Only the deviating elements will be referred to below. In this example, the housing and the washing chamber are not shown in order to simplify the drawing, but the washing chamber is required in the same way as mentioned above. The inlet aperture 18 is arranged directly in the cover face 14, i.e. an inlet sleeve is not provided. This provides the possibility of simplifying the design. A line 33 is connected to the pump 30 and leads directly into the drum 27. As a result, the drum 27 does not necessarily need an open-worked casing 13. The drum 27 is supported in rollers 34, 35 on its casing 13, and the casing can be provided with suitable circumferential tracks for axially guiding the drum. Via a chain drive 25, the electric motor 26 drives a friction roller 36 which effects the drum drive. In this case, too, the drum can be driven in both directions of rotation.

Figure 18:
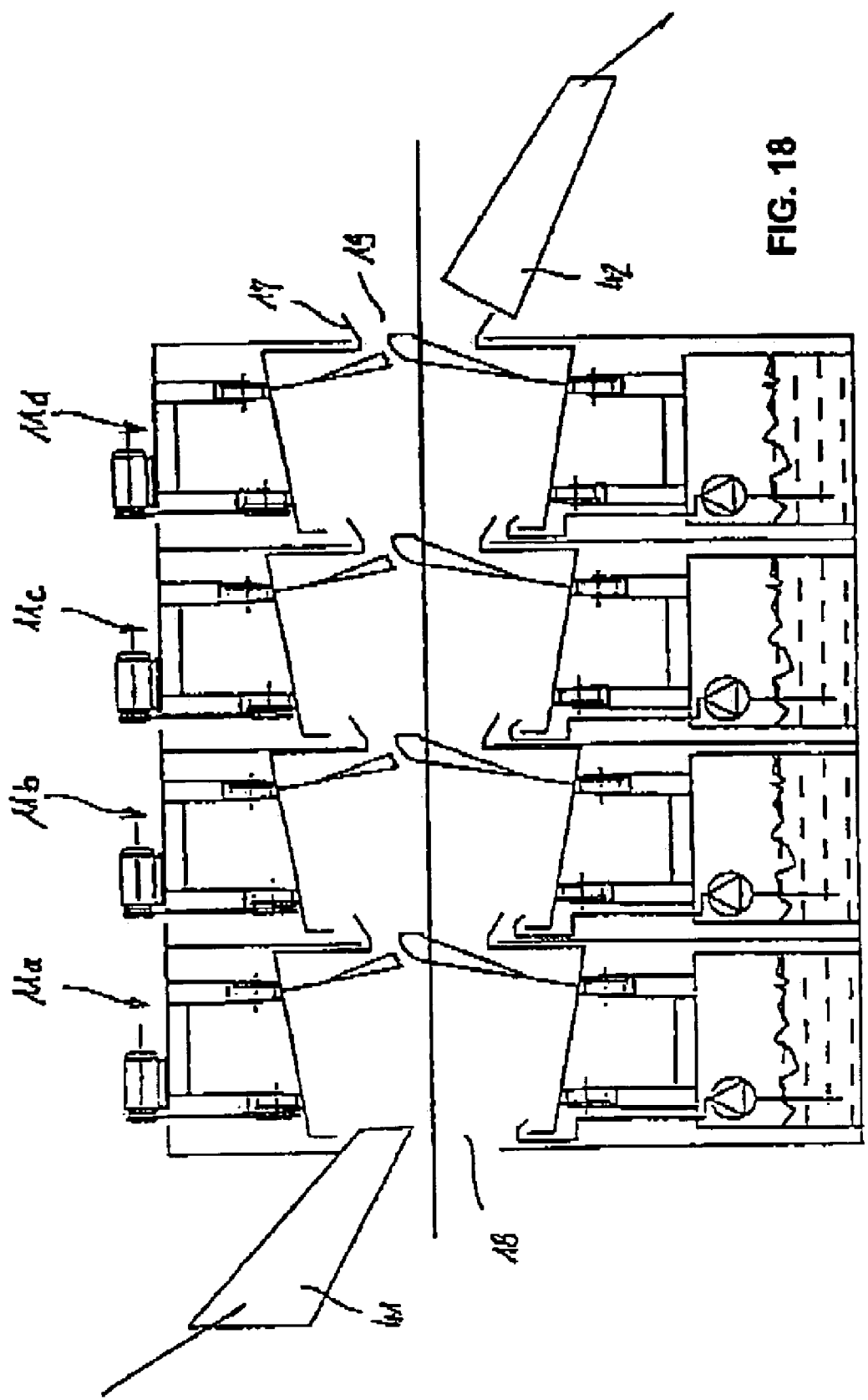
FIG. 18 shows a plant of machinery with four individual machines according to FIG. 17 in a longitudinal section.

In FIG. 18, four individual machines according to FIG. 17 have been combined to form a modular plant of machinery which, again, comprises an inlet chute 41 and a discharge chute 42. The discharge sleeves of the preceding machines extend through the inlet aperture 18 into the drum of the subsequent machine. As far as functioning is concerned, reference is made to the description of FIG. 16. The same process can be applied here and, as well, the number of machines can vary.

Figure 19:
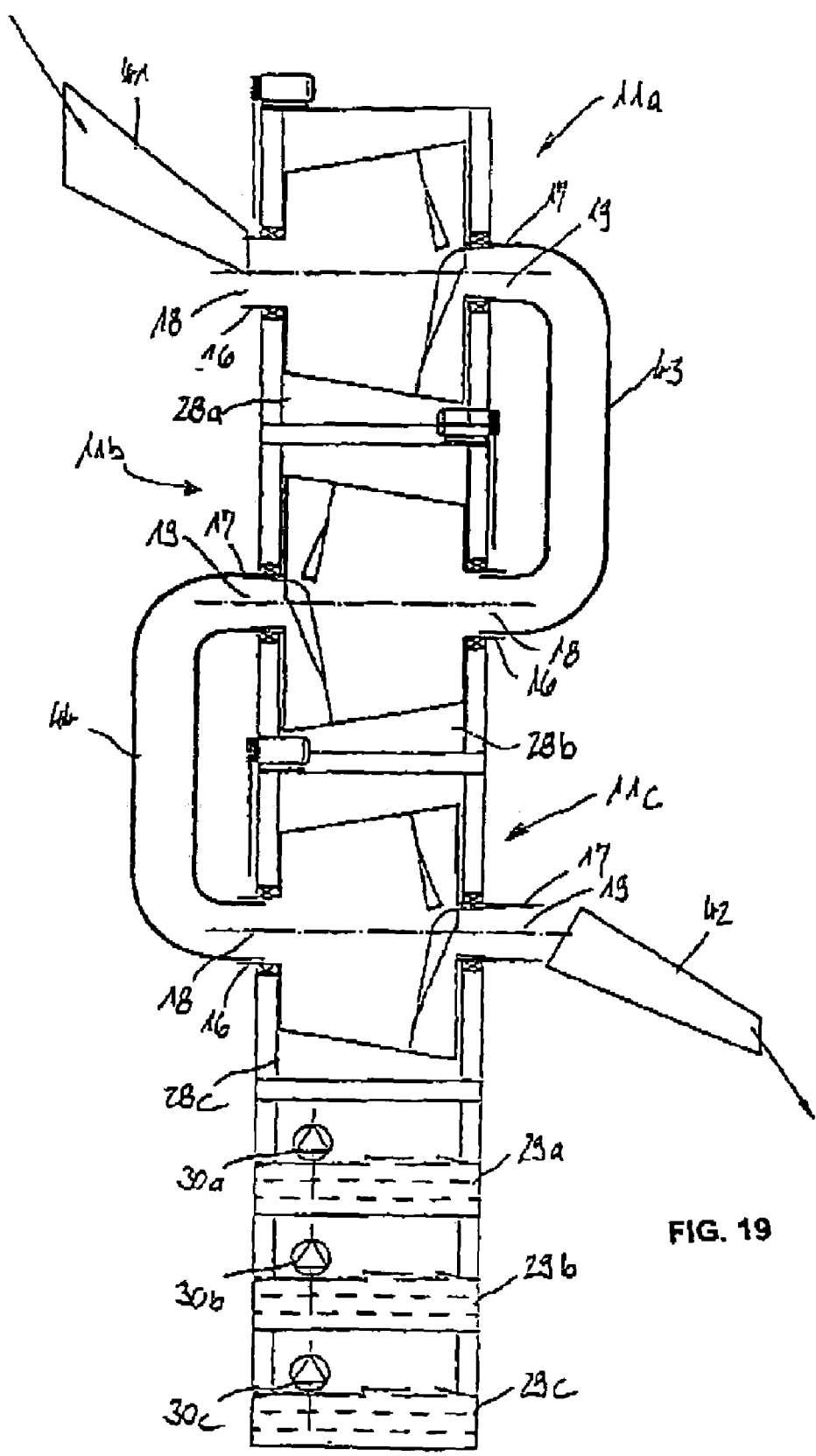
FIG. 19 shows a plant of machinery with three individual machines similar to FIG. 13 in a longitudinal section.

In FIG. 19, three individual machines according to FIG. 13 have been combined to form a modular plant of machinery which, in addition, comprises an inlet chute 41 and a discharge chute 42. The inlet chute 41 extends into the inlet aperture 18 of the first upper individual machine 11a arranged in the conveying direction. Into the discharge chute 42 there extends the discharge sleeve 17 of the last lower individual machine 11c arranged in the conveying direction. Between the two machines, there is provided the individual machine 11b which is the second machine in the conveying direction and whose direction of throughput, contrary to that of the previously mentioned machine, extends from right to left, with a first delivery pipe 43 connecting the discharge aperture sleeve 17 of the first machine 11a to the inlet aperture 18 of the second machine 11b and with a second delivery pipe 44 connecting the discharge sleeve 17 of the second machine 11b to the inlet aperture 18 of the lower machine 11c. The present example deviates from the embodiment of the individual machines according to FIG. 13 in that the liquid tanks 29a,29b and 29c are arranged one above the other underneath the three machines whose washing chambers 28a,28b and 28c are stacked directly one above the other. The chamber 28 and the liquid tanks 29 can be stacked one above the other in an upright rack. The individual liquid tanks and thus the individual chambers can be operated with different treatment liquids. The conveying lines from the pumps 30a,30b,30c to the chambers and the return lines from the chambers to the tanks are not shown. The delivery pipes 43, 44 can be firmly arranged in the upright frame after the individual machines have been stacked.

The three illustrations of FIG. 20 will be described jointly below. A treatment machine 11 comprises a housing 12 in which a treatment drum 27 is rotatably supported around an axis A. The treatment drum comprises an open-worked and thus liquid-permeable cylindrical drum casing 13 with two cover faces 14, 15 which are each followed by co-axial sleeves 16, 17, an inlet sleeve 16 which forms an inlet aperture 18 and a discharge sleeve 17 which forms a discharge aperture 19. The drum is supported on two bearings 20, 21 on its sleeves in the housing 11. The housing 11, in its entirety, can be tilted around an axis of rotation 45 which extends perpendicularly relative to the drawing plane, with the tilting movement being effected by a setting cylinder 46 which is secured to a stationary holding member 57 and acts on a pivot lever 48 connected to the housing 11. Inside the drum, there is provided a set of worm-like blades comprising two blades 22, 23 which, at a distance, begin at the cover face 14 at the inlet end and extend as far as the cover face 15 at the discharge end, i.e. as far as the discharge sleeve 17. On the inlet sleeve 16 there is positioned a chain gear 24 which, via a chain drive 25, is connected to an electric motor 26 arranged on the housing 15. In this way, the drum 27 can be driven by the electric motor 26 in both direction of rotation. Underneath the housing 11, there is provided a firmly installed liquid tank 29 with a drum 30 by means of which the chamber 28 formed by the housing can be flooded. The washing chamber 28 and the tank 29 are connected to one another via a pump 30 and a return line 31, with the line connections being flexible.

In the treatment position with a horizontal drum axis A and thus with a horizontal lower casing line of the drum 27, as shown in illustration 20B, the direction of rotation of the drum is such that the blades convey the bulk material towards the inlet aperture 18. In the process, the bulk material is uniformly distributed across the drum portion not comprising any blades. In the position according to illustration 20A in which the drum axis A descends from the inlet end to the discharge end and in which, thus, the lower casing line of the drum 27 is inclined in the same direction, the direction of rotation of the drum is such that the blades convey the bulk material from the drum casing 13 into the discharge sleeve 17. The bulk material in the drum casing continues to slide towards the blades.

FIGS. 21A–21D do not show the setting cylinder, holding member and pivot lever, but in this case, too, a suitable pivot mechanism (not illustrated in detail) for the treatment chamber is provided. In illustration 21D, the treatment drum 27 is pivoted into a centrifuging position with a vertical drum axis A. Hereafter it is possible—with the direction of rotation being as shown in illustration 21B—to slowly increase the rotational speed and simultaneously to pivot the drum axis A into the vertical position, with the treatment liquid previously having been pumped off.

It is thus possible, in an advantageous way, to carry out the centrifuging process while avoiding any out-of-balance symptoms in the bulk material. At the end of the centrifuging operation, the drum—with the rotational speed still being slightly increased—is returned into the position as shown in illustration 21A. Thereafter, the direction of rotation of the drum can be reversed into the direction of rotation required for emptying purposes. Otherwise, reference is made to the description of FIG. 20.

Figure 20C:
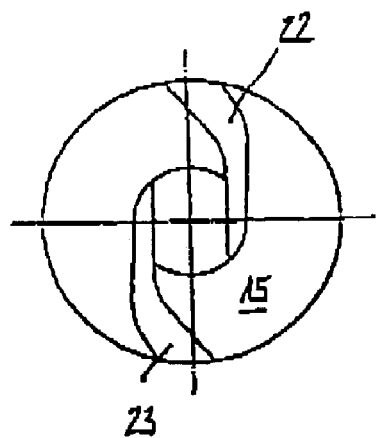
FIG. 20 shows an individual machine according to the present invention in still another embodiment
A) in a longitudinal section in a first position
B) in a longitudinal section in a second position
C) in a cross-section through the treatment drum.
Figure 20B:
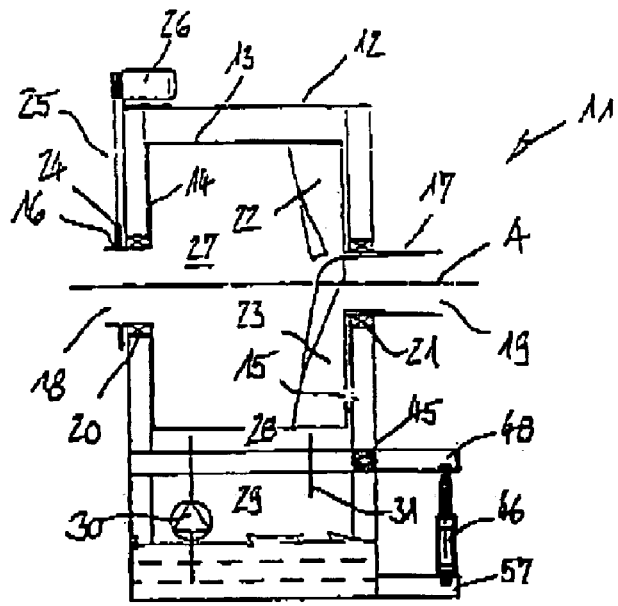
Figure 20A:
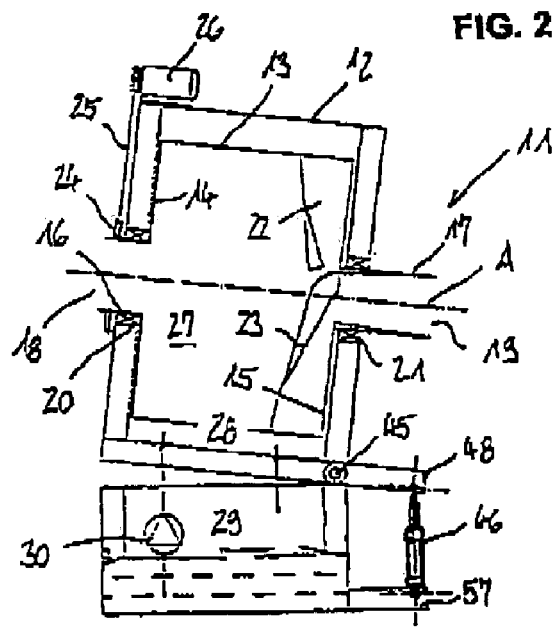
Figure 22:
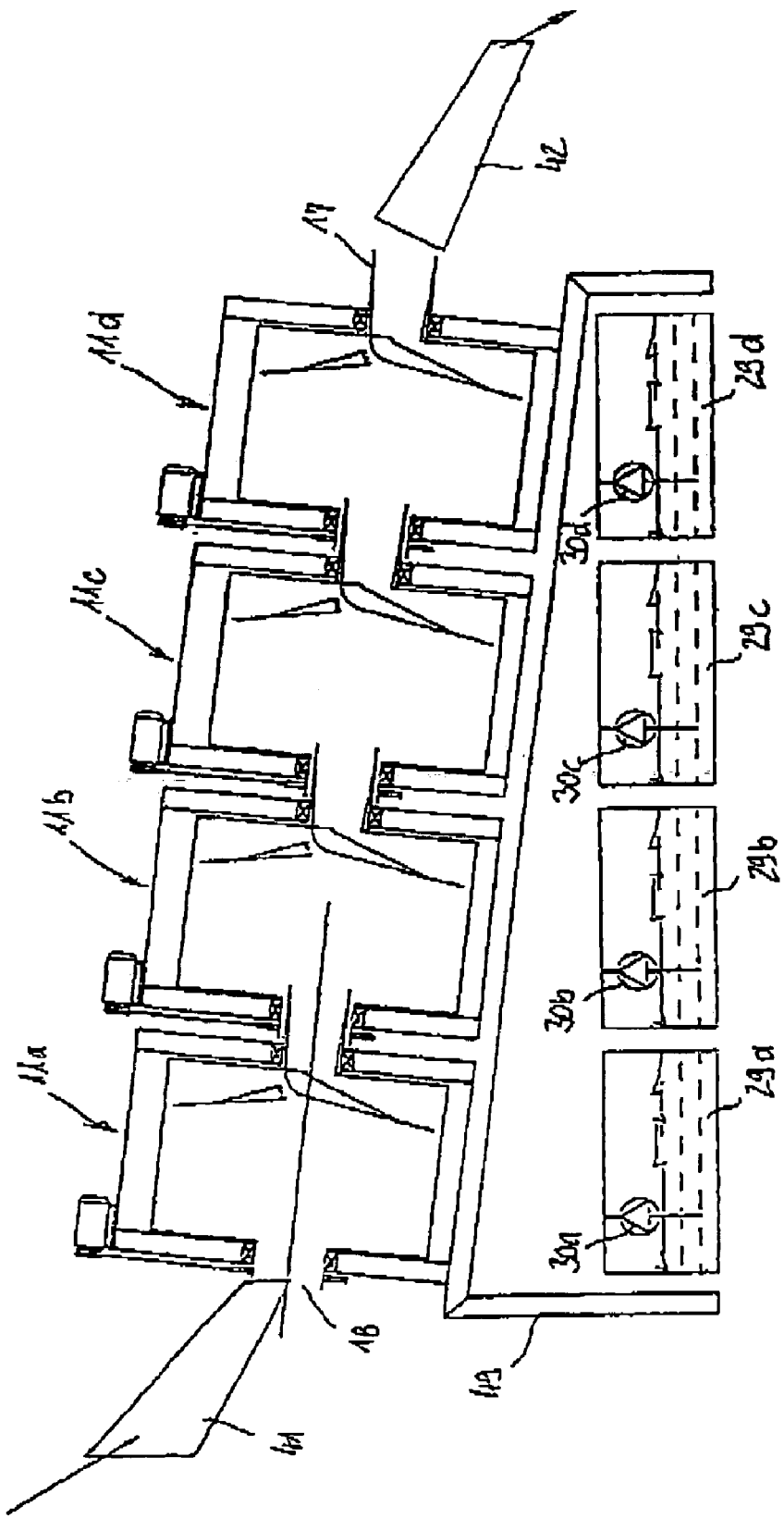
FIG. 22 shows a plant of machinery with four individual machines according to FIG. 20 in a longitudinal section.

FIG. 22 shows four individual machines similar to FIG. 20 which have been combined to form a modular plant of machinery and which, in addition, comprises an inlet chute 41 and a discharge chute 42. The individual machines 11a,11b,11c,11d, however, have not been provided with a tiltable axis, but are mounted on a wedge-shaped base 49 whose axis descends from the inlet end to the discharge end. An inlet sleeve 16 of a further machine is slid over the discharge sleeve 17 of a machine preceding in the conveying direction. The liquid tanks 29 are erected underneath the base 49 on the same level. The line connections are not shown in this case. Otherwise, reference is made to the description of FIG. 10. The individual machines 11a,11b,11c can deviate from the illustration shown in that they are produced so as to be integral with the liquid tanks, with each one individually being firmly wedged on. In this case, the inlet sleeves 16 may have to be widened in order to permit the discharge sleeves 17 and inlet apertures 18 to be inserted into one another.

From the foregoing, it can be seen that there has been brought to the art a new and improved modular treatment plant having horizontal drum machines that has a simplified construction and is efficient. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A machine for treating bulk material of industrial volume parts comprising:
   a treatment drum which is arranged with a substantially horizontal axis and adapted to be driven in both directions of rotation around said axis, the treatment drum comprising a permanently open co-axial inlet aperture, a permanently open co-axial discharge aperture, and a set of worm-like inner blades which extend at least as far as the discharge aperture and which, in the first direction of rotation of the treatment drum, reposition the bulk material in the drum and, in the second direction of rotation of the treatment drum, convey the bulk material through the discharge aperture,
   wherein the treatment drum widens from a filling end and from a discharge end towards an intermediate plane respectively,
   wherein the set of inner blades extends approximately from the intermediate plane to the discharge aperture,
   wherein the discharge aperture is followed by a discharge sleeve and
   wherein the inlet aperture is greater than an outer diameter of the discharge sleeve.

2. A machine according to claim 1 wherein the drum comprises at least two rotationally symmetrical plate metal parts.

3. A machine according to claim 1 wherein the drum comprises an open-worked casing and is arranged in a chamber which can be flooded with a liquid.

4. A machine according to claim 3 wherein the chamber is a collecting chamber for cooling or cutting oil, or cooling or cutting emulsion.

5. A machine according to claim 3 wherein the chamber is a drying chamber which can be charged with a flow of hot air.

* * * * *